United States Patent
Rackley, III et al.

(10) Patent No.: US 12,437,331 B1
(45) Date of Patent: *Oct. 7, 2025

(54) METHOD AND SYSTEM FOR CONNECTING AND FACILITATING THE MACHINE-TO-MACHINE DELIVERY OF A GIFT THAT MAY OR MAY NOT HAVE MONETARY VALUE

(71) Applicant: Moment Network, LLC, Atlanta, GA (US)

(72) Inventors: Brady Rackley, III, Atlanta, GA (US); Steven Neel, Atlanta, GA (US); Garrett Langley, Atlanta, GA (US); Matt Moddelmog, Atlanta, GA (US); John Nystrom, Atlanta, GA (US); Benjamin Charity, Atlanta, GA (US)

(73) Assignee: MOMENT NETWORK, LLC, Atlanta, GA (US)

( * ) Notice: Subject to any disclaimer, the term of this patent is extended or adjusted under 35 U.S.C. 154(b) by 528 days.

This patent is subject to a terminal disclaimer.

(21) Appl. No.: 17/126,774

(22) Filed: Dec. 18, 2020

Related U.S. Application Data

(63) Continuation of application No. 15/464,229, filed on Mar. 20, 2017, now Pat. No. 10,885,572.

(51) Int. Cl.
*G06Q 30/0601* (2023.01)
*G06Q 10/083* (2024.01)
(Continued)

(52) U.S. Cl.
CPC ....... *G06Q 30/0635* (2013.01); *G06Q 10/109* (2013.01); *G06Q 50/01* (2013.01); *G06Q 10/083* (2013.01)

(58) Field of Classification Search
CPC .. G06Q 30/0635; G06Q 10/109; G06Q 50/01; G06Q 10/083
See application file for complete search history.

(56) References Cited

U.S. PATENT DOCUMENTS

2014/0316937 A1* 10/2014 Jiao .................... G06Q 30/0643
  705/26.8
2015/0112790 A1*  4/2015 Wolinsky ........... G06Q 20/3274
  705/14.38

OTHER PUBLICATIONS

Arpit Gupta, Method and System for Automatically Sending Gifts based on User Defined Policies, Oct. 1, 2010, The IP.com Journal, Yahoo! (Year: 2010).*

(Continued)

*Primary Examiner* — Jeffrey A. Smith
*Assistant Examiner* — Latasha D Ramphal
(74) *Attorney, Agent, or Firm* — Smith Tempel; Steven P. Wigmore

(57) ABSTRACT

A computer-implemented method and system for facilitating a sending of a gift from a first machine to a second machine may include a processor of a computer server reviewing a first list of one or more names of people maintained in a computer database. The processor may review context information related to the one or more names to determine if a moment exists for sending a gift from a first machine to a second machine. Each of the one or more names is associated with a respective second machine. The processor may automatically generate a second list of one or more names of people associated with a moment for receiving a gift. The processor of the computer server may receive from a first machine a selection of at least one of the names on the second list who have been identified as associated with a moment for receiving a gift.

13 Claims, 14 Drawing Sheets

(51) Int. Cl.
*G06Q 10/109* (2023.01)
*G06Q 50/00* (2024.01)

(56) References Cited

OTHER PUBLICATIONS

Julie Gu, title, "The Rise of Digital Gift Giving," from https://www.mytotalretail.com/article/the-rise-of-digital-gift-giving/, accessed on Feb. 15, 2025, published Jul. 31, 2023, four pages.

\* cited by examiner

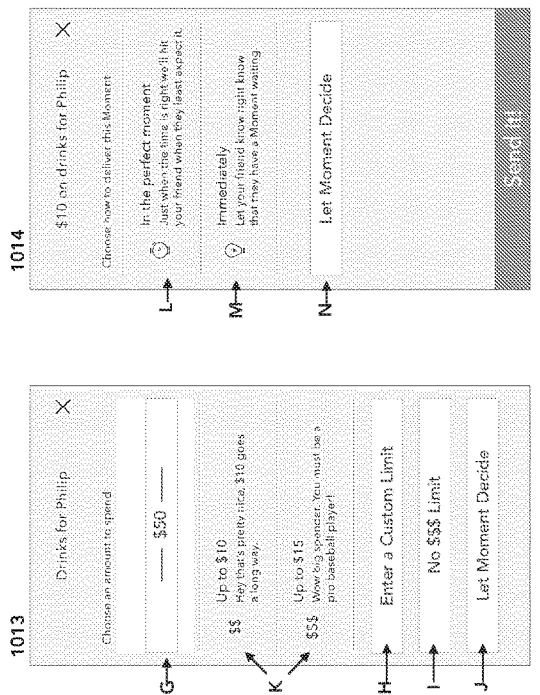
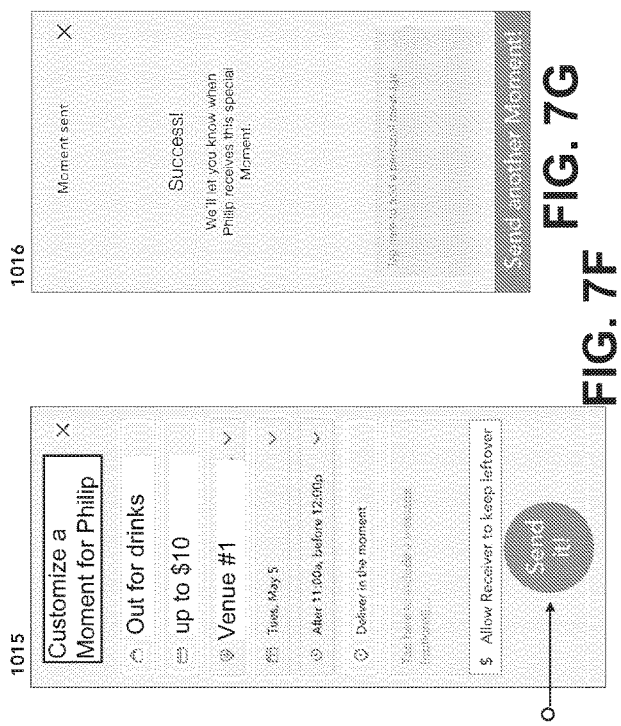
FIG. 7A FIG. 7B FIG. 7C FIG. 7D FIG. 7E FIG. 7F FIG. 7G

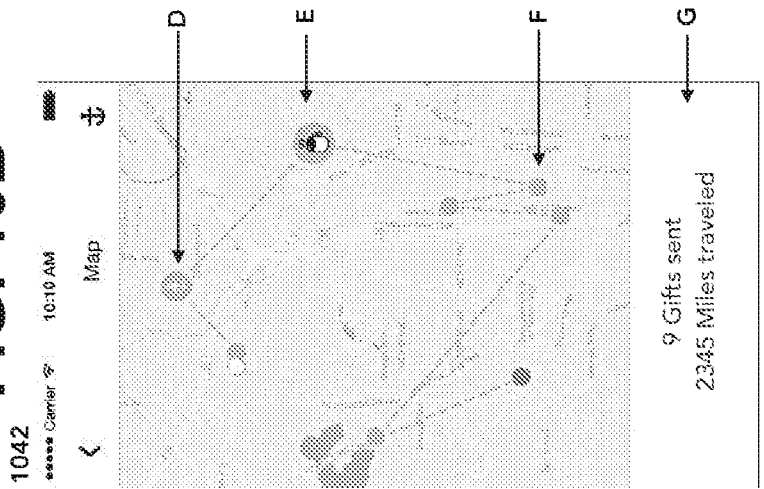
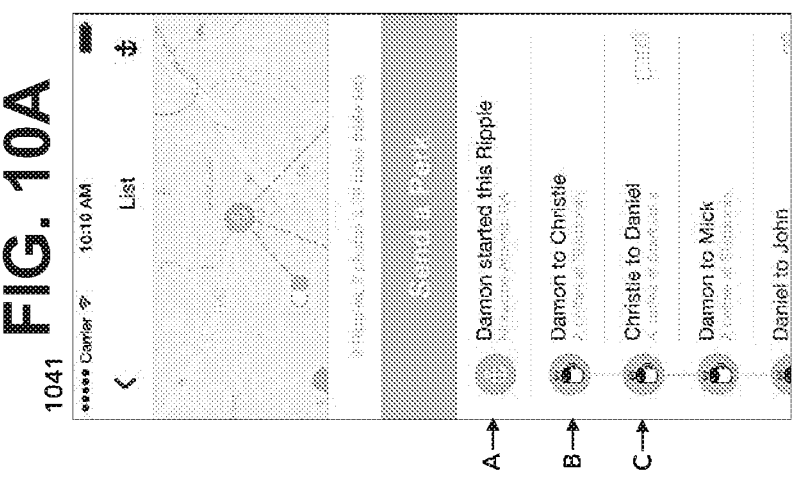

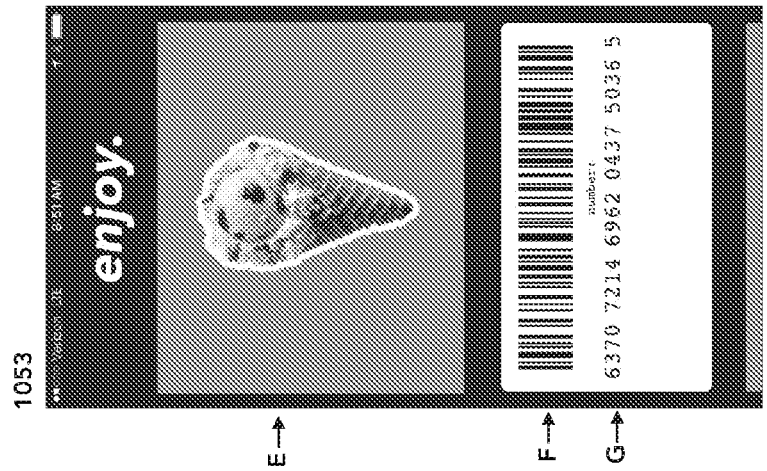
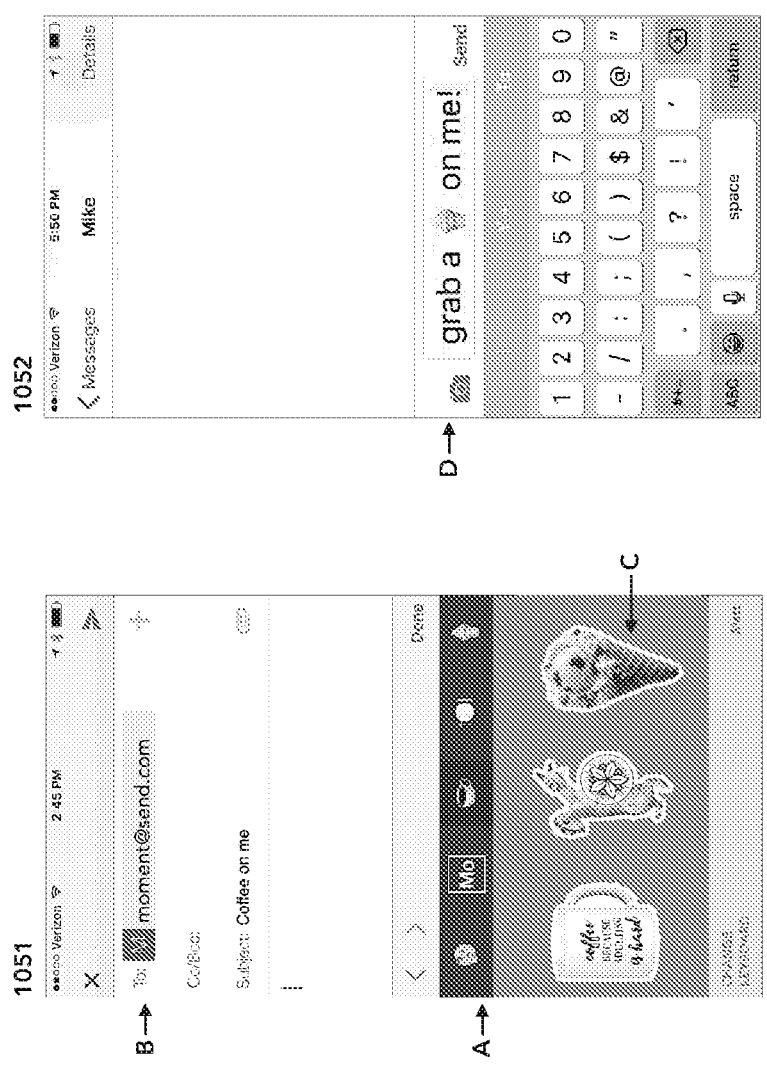

FIG. 12

| | Facebook positive reaction ←D | Facebook (negative reaction) ←E | SMS positive texts ←F | Moment Network Platform ←G | User Sentiment Score ←H |
|---|---|---|---|---|---|
| User A ←A | 100 | -20 | 50 | 50 | 180 ←AA |
| User B ←B | 10 | -150 | — | 20 | -120 ←BB |
| User C ←C | 25 | 0 | 25 | 10 | 60 ←CC |

1200

METHOD AND SYSTEM FOR CONNECTING AND FACILITATING THE MACHINE-TO-MACHINE DELIVERY OF A GIFT THAT MAY OR MAY NOT HAVE MONETARY VALUE

PRIORITY AND RELATED APPLICATIONS STATEMENT

This patent application claims priority under 35 U.S.C. § 119(e) to U.S. Provisional Patent Application Ser. No. 62/310,342, filed on Mar. 18, 2016, entitled, "A METHOD AND SYSTEM FOR CONNECTING AND FACILITATING THE DELIVERY OF AN ELEMENT OR SERVICE, WITH OR WITHOUT MONETARY VALUE, ON A PORTABLE COMPUTING DEVICE (PCD) FROM ONE INDIVIDUAL TO ANOTHER," the entire contents of which are hereby incorporated by reference.

DESCRIPTION OF THE RELATED ART

Sending a gift today to a person may present many problems for both the Gifter and the Receiver. For the Gifter, problems may include identifying intended Receiver, why to send a gift the Receiver, what the gift should be, when to send a gift, where to deliver a gift, and how to deliver a gift. And there have not been any Systems established that help the Gifter sending a gift remove these burdens. For the Receiver, problems may include knowing the best gift he or she would like to receive, an optimal time the gift is delivered to the Receiver, remembering when the gift is received, as well as how to respond to the Gifter to acknowledge receipt and to extend any gratitude to the Gifter as appropriate.

Stated more simply, giving and receiving gifts is often burdensome, for both the Gifter and the Receiver, with hurdles that prevent the successful exchange and delivery for both parties. And systems have not been established to solve problems for both the Gifter and Receiver.

There are innumerable complex methods available to send a gift today. Traditionally, this exchange is accomplished by the Gifter visiting a retail store where an element is purchased and then subsequently delivered physically by the Gifter directly to the Receiver. More recently, purchase and delivery options have expanded with the prevalence of the Internet.

Purchases can be made online and a Gifter may ship a gift directly to the intended Receiver's home address. Furthermore, a similar exchange can all occur online with an Gifter sending a digital gift, such as a gift card, to a Receiver's digital address, such as an email address.

However, all gifting methods today, including traditional and the more recent digital gifting solutions, often share the same core problems for both the Gifter and the Receiver: none of the conventional methods solve the aforementioned problems of who, why, what, when, where and how to achieve the sending of a gift. And none of the conventional technologies solve many of the problems mentioned for the Receiver, including knowledge of what the best gift is, optimal time a gift is delivered, remembering a gift is waiting to be redeemed, and how to acknowledge the Gifter that the gift has been received.

What is needed is a method and system that aids both the Gifter and Receiver with the complex problems surrounding both the sending and receiving of gifts, whether they be physical or digital, of monetary value or not, and delivered in a retail store or delivered digitally.

SUMMARY OF THE DISCLOSURE

A computer-implemented method and system for facilitating a sending of a gift from a first machine to a second machine may include a processor of a computer server reviewing a first list of one or more names of people maintained in a computer database. The processor of the computer server may review context information related to the one or more names to determine if a moment exists for sending a gift from a first machine to a second machine. Each of the one or more names being associated with a respective second machine.

The processor of the computer server automatically generating a second list of one or more names of people associated with a moment for receiving a gift. The processor of the computer server may receive from a first machine a selection of at least one of the names on the second list who have been identified as associated with a moment for receiving a gift.

The processor of the computer server may determine one or more gifts for each name that is selected from the second list based on at least one of preference information and context information stored in a computer database. The computer server may store the one or more gifts in a third list.

The processor of the computer server sends the third list to the first machine and receives from the first machine a selection of a gift from the third list. The processor of the computer server may contact a content provider for arranging delivery of the gift to a second machine associated with a name selected from the second list.

The processor of the computer server may send a message to the second machine that a gift is being sent to the second machine. The first machine and second machine may comprise portable computing devices that are battery-powered hand-held devices. Specifically, the portable computing devices may comprise mobile telephones.

The computer server may also monitor on-line social media to determine a moment for sending a gift from the first machine to a second machine as well as monitoring on-line social media to obtain feedback on the system.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIGS. 7A-7G are exemplary screen shots of a portable computing device running software that illustrates the collection of gift data to facilitate the sending of an element by a Gifter according to exemplary embodiments;

FIGS. 10A-10B are exemplary screen shots of a portable computing device running software that maps User interactions according to exemplary embodiments;

FIGS. 11A-11C are exemplary screen shots of a portable computing device running software that uses emojis and receiver redemption according to exemplary embodiments;

FIG. 12 is an exemplary table illustrating User Sentiment Scores according to one exemplary embodiment;

DETAILED DESCRIPTION

The term "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," "engine", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer.

By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
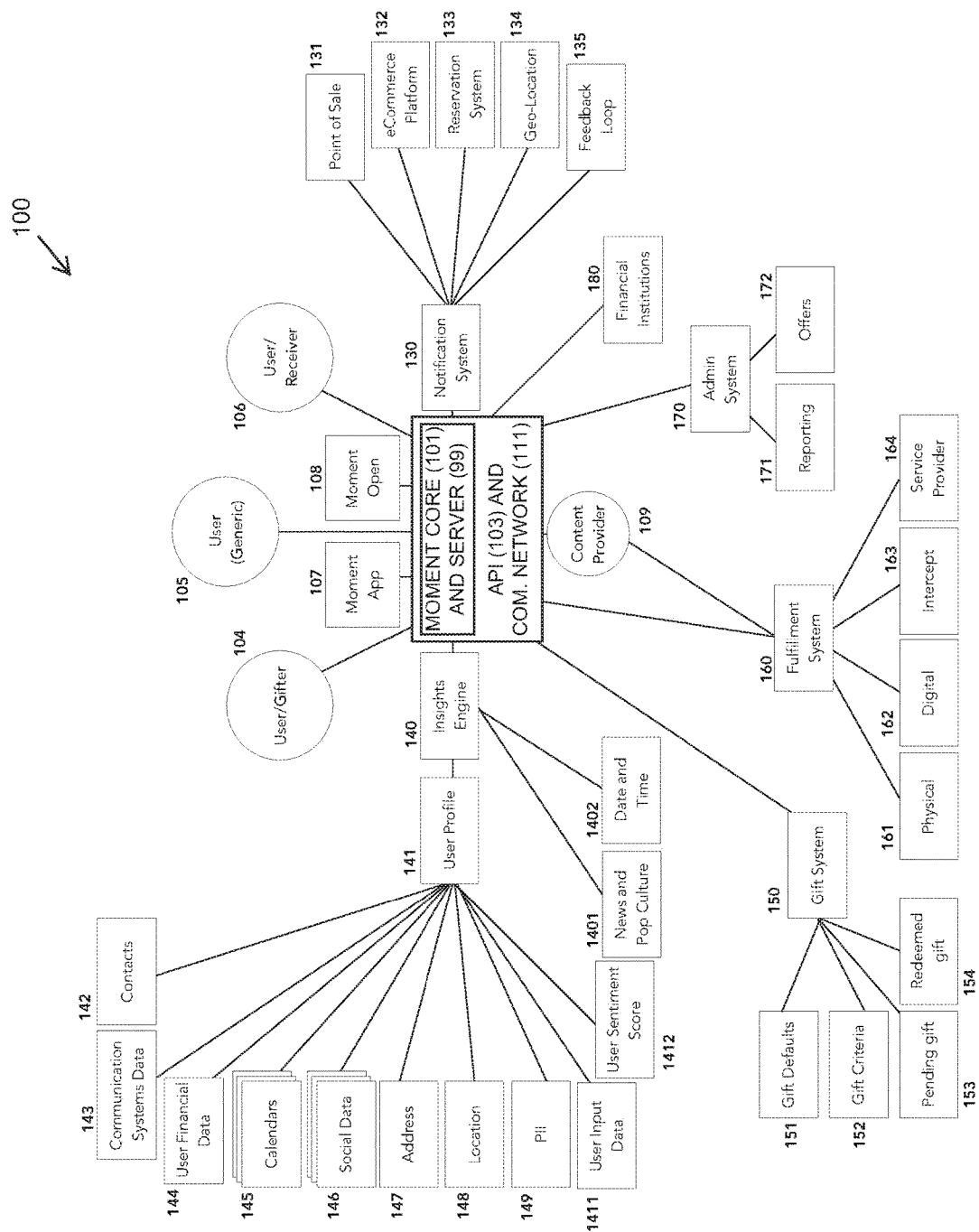
FIG. 1 is functional block diagram of an exemplary system for sending gifts that includes dynamic components designed to capture a Gifter's information and request, interactions with a merchant or delivery mechanism, and delivery of the intended element or service to the intended Receiver according to one exemplary embodiment.

Referring now to the drawings, wherein the showings are for purposes of illustrating certain exemplary embodiments of the present disclosure only, and not for purposes of limiting the same, FIG. 1 is functional block diagram of an exemplary system 100 for sending gifts that includes dynamic components. These dynamic components of system 100 are designed to capture a Gifter's information and request, interactions with a merchant or delivery mechanism (i.e. fulfillment system 160), and delivery of the intended element or service to the intended Receiver 106 according to one exemplary embodiment.

Moment Core 101 may comprise at least one of computer software, hardware, or both and/or firmware, that store and filter information for facilitating the creation and delivery of a gift. Moment Core 101 may run/be executed by a computer server 99.

Moment Core 111 may communicate with other software or hardware over via an Application Program Interface (API) 103) and via a communications network 111. The communications network 111 may comprise a wide area network ("WAN"), the plain-old-telephone-system ("POTS), a local area network ("LAN"), the Internet, or any combination of these and other types of networks. Through the network 111, the server 99 may communicate with the client devices 104, 105, 106 and the other servers 130, 140, 109, 160, 170, etc.

Each of the computer servers described herein as well the client devices 104-106 may support various submethods/routines which are part of a larger method for facilitating the transfer of a gift from a first machine 104 to a second machine 106. In a particular aspect, one or more of the method steps described herein may be implemented by executable instructions and parameters, stored in the memory 1208, 112 (See FIGS. 13-14) and databases 109, 141, etc. that may form software embodiments of the gifting system 100. These instructions that form the gifting system may be executed by the CPUs 1206, 1324 (See FIGS. 13-14) or any other processor. Further, the processors, 1206, 1324, the memory 1208, 112, the instructions stored therein, or a combination thereof may serve as a means for performing one or more of the method steps described herein.

Many of the software elements illustrated in FIG. 1 may include an application programming interface (API) 103 and related components as understood by one ordinary skill in the art. As illustrated in FIG. 1, a "Gifter" 104 is a first machine, like a first mobile phone, of system 100 that initiates an action, running the moment application software 107 that is coupled to the server 99 across the communications network. The action of the Gifter/User 104 may be directed toward another second machine that may comprise a portable computing device, such as a second mobile phone, designated as a "Receiver" 106. This second mobile phone 106 may also run the moment application software 107 which is coupled to the server 99 across a communications network 99.

The terms Gifter 104 and Receiver/Receiver 106 will be referenced from this point forward and will correspond to machines—and specifically the portable computing devices, like mobile phones, were the first phone 104 sends a gift to the second phone 106. A machine, like a portable computing device 105 not running the moment application software 107 will be referenced as a generic user 105 of the system 100.

As illustrated in FIG. 1, a user 105 is a known member of the system 100, though it is a device which is not in an active state of sending or receiving a gift. A User 105 of the system 100 may be required to be registered in order to use the system 100 as intended, though may also exist as an unregistered, but recognized member by the system 100 with some unique identifier (such as, but not limited to, an email address or phone number). Registration and User identification for the system 100 is covered more extensively in connection with FIG. 2 described below.

The gifter portable computing device "PCD" 104 and receiver PCD 106 both may comprise a wireless, mobile telephone (such as an Apple iPhone or Samsung Galaxy phone) or other digital communication device (such as an Apple iPad or Dell desktop computer). The Gifter 104 and Receiver 106 may communicate with Moment Core 101 over a wired network or wireless network 111 (such as, but not limited to, a local area network [LAN] or mobile telephone network).

A User device 105 may access the system 100 through a Moment Application (App) program 107, which serves as a specific platform for the User to interact with the system 100 (common examples found through Apple App Store and Google Android Apps). Alternatively, a User device 105, if the device 105 comprises a desktop computer or laptop computer [See FIG. 13], may access the system 100 via Moment Open application software 108 via a platform able to access and perform operations on the Internet like common web browsers (such as Safari and Chrome); by other platforms or programs with access to the mobile web (such as Google Mail and Slack); or via plug-ins to other platforms or programs (such as Google Mail, Apple iMessage and Salesforce Enterprise App).

Both Moment App 107 and Moment Open 108 are considered as valid platforms for supporting the functions and features of the system 100. Additionally, Moment Core 101, and its various components, have the ability to communicate over the communications network 111 with other computer servers, such as a server running an insights engine 140, a server running a notifications system 130, and a server supporting a content provider 109.

Content Provider 109 may comprise a computer server that serves Moment Core 101 by providing the source for a good or service that a Fulfillment System 160 leverages to transfer from Gifter 104 to Receiver 106 as a gift. Content Provider 109 comprise computer servers of retailers (like Macy's and Amazon), computer servers of service providers (like Merry Maids home cleaning), computer servers supporting digital media (like Netflix), and servers that may support other digital resources (like an emoji platform that serves pictographs).

The Insights Engine 140 may comprise a computer server running software that filters user 105 information accessed by Moment Core 101 from across the communications network 111. This saved user information may comprise a User Profile 141 accessed and created by the insights engine 140. The User Profile 141 may function as a repository of attributes for a given User and accessed by the Moment Core 101 and its components as they carry out operations. A User 105 may create a single verified identity via a unique User Profile 141 stored by Insights Engine 140, which provides Moment Core 101 and its components information on Users for use by the System.

The User Profile 141 may include: Contacts data 142 (like saved contacts—names, phone numbers, physical addresses, and e-mail addresses on a User's PCD or contacts from a User's email platform, like Microsoft Outlook); Communication Systems Data 143 (like SMS texts through Apple iMessage, conversations through Facebook Messenger, among any other data a user makes available from other communication platforms they may use); User Financial Data 144 (such as a bank account info and/or credit card accounts); Calendars 145 (like Google Calendar and Microsoft's Sunrise Calendar); Social Data 146 from social media accounts (like Facebook account info including running feeds from Facebook accounts and Twitter account info and running feeds from the Twitter account); other Addresses 147 (which may include digital User addresses like a MySpace or Facebook pages), Location 148 of the PCD running the moment app 107 (which may be acquired by the moment app 107 via Geo-Location 134 or by a User self-reporting their location); Personally Identifiable Information (PII) 149 (which may include sensitive attributes for a particular User, such as a social security number or driver's license number); other self-inputted User Input Data 1411 (such as personal gifting preferences like preferred dollar amount to spend, favorite friends or preferred gifting occasions); or User Sentiment Score 1412 (which is a summation of positive and negative activity by a particular User of the system 100).

The Insights Engine 140 may continuously monitor and filter additional information like News and Pop Culture 1401 (such as a world event like the Olympics, a National event like the NFL Super Bowl, or a local event like a county fair); Date and Time 1402, among other data inputs the System may have access to. This information from the Insights Engine 140 may determine how the system 100 interacts with a gifter 104 and receiver 106. The Insights Engine 140 may inform the Moment Core 101 to activate the Notification System 130, by which the System 100 communicates information to a User.

The Notification System 130 may comprise a computer server running software that is accessed by Moment Core 101 across the communications network 111 to facilitate the communication between the Gifter 104 and Receiver 106, other platforms and programs. The Notification System 130 may communicate with one or more of the following systems: a point of sale device 131 at a retailer; an e-commerce platform 132 like Amazon or eBay on-line stores; and a Reservation System 133 of a service provider like an Airline, Hotel, or rental car.

The Notification system 130 may also access information such as GPS-based Geo-Location 134 of the Gifter 104 and/or the Receiver 106. The Point of Sale 131 device may be a physical, in-store component that accepts and processes a transaction or may be online through a retailer's eCommerce Platform 132, or some not yet known means of recognizing and processing a customer's purchase. An eCommerce Platform 132 is recognized as a retailer's digital store where a customer may digitally interact with and purchase a retailer's goods. The Reservation System 133 may also include one or a number of platforms or programs, such as OpenTable's reservation platform; a specific restaurant, spa, recreational or fitness club reservation program; among other programs or platforms an individual may use to book and hold time with some other entity. Geo-Location 134 refers to a specific technology use by Notification System 130 in which a Gifter 104 or a Receiver 106 has their location recognized by Moment Core 101 and in which that location merits a communication as determined by Notification System 130. The System 101 may receive Geo-Location data from a number of technologies like software installed in many smart phone devices, RFID radio technology, or some other location technology available to the system.

The Notification System 130 may also access a Feedback Loop 135. Feedback Loop 135 refers to the Notification System 130 providing communication among relevant Gifters104/Receivers 106 for a given action executed by Moment Core 101. For instance, Notification System 130 may send the Gifter 104 a communication that their Receiver 106 has received their gift, essentially closing the loop on the communication for that particular action, which removes that burden from the Receiver 106. Notifications are direct communications or prompts sent to Gifters 104 and/or Receivers 106 and may be sent by Notification System 130.

Referring now to the Gift System 150, the Gift System 150 receives direct inputs from the moment core 101 to facilitate the selection and delivery of a gift from a Gifter 104 to a Receiver 106. A Pending Gift 153 is an element a Gifter 104 has sent through the system to another Receiver 106, but that has not yet been received or redeemed by that Receiver 106. Once the element is received or redeemed by Receiver 106, the Pending Gift 153 will be referred to as Redeemed Gift 154 to help better communicate user flows and use cases.

Gift Defaults 151 may include gift options such as a dinner out, a specific element like a baseball cap, a specific service like a home cleaning, a category such as "Spa Day" or some other gift description or gift type. Gift Defaults 151 may be dynamically presented by Moment Core 101 based on information held by the Insights Engine 140 and may be influenced by a profile of Receiver 106 stored in user profiles 141.

Gift Defaults 151 may comprise data such as tagged criteria, or Gift Criteria 152, that the Gift System 150 logs with the system 100 in order to use in creating and delivering a Pending Gift 153. Gift Criteria 152 may include data defined by the Fulfillment System 160 such as how a gift is to be executed or may include data defined by Insights Engine 140 that may associate specific gift types for specific times of the year (like suggesting a package of chocolates around Valentine's Day) or other criteria saved to a User Profile 141. A Gifter 104 may also be able to self-enter criteria that will be used by Gift Criteria 152 to determine Gift Defaults 151, and logged by Gift System 150 (like preferences of price point or occasion for a User to send or receive a gift) to User Profile 141. The Gift System 150 logs and records events associated with a particular Pending Gift 153 that may originate from the Fulfillment System 160 on how and when the Notification System 130 will be engaged/communicated with to alert the Receiver 106 of a delivery of his or her gift.

Referring now to the Fulfillment System 160, this system 160 is responsible for executing a Pending Gift 153 to the Receiver 106. The elements may originate from Content Providers 109, which may include Physical stores 162 (brick and mortar stores like Macy's or a local bakery), Digital platforms 162 (like eCommerce Platforms 132 Gilt.com or Macy's.com), during an event Intercept 163 (such as a musical concert venue or while dining out at a restaurant), a Service Provider 164 (like Merry Maids home cleaning or delivery service like Uber or United Parcel Service), or through some other merchant or service provider (such as an emoji platform that serves pictographs like smiley faces).

Referring now to the Admin System 170, this system comprises a computer server running software that communicates with and enables Moment Core 101 to manage attributes of all other components of the system 100 (such as Users 104, 105, 106, User Profiles 141, and Content Providers 109, etc). Reporting 171 is a sub-module/component of the Admin system which may provide output from the system 100 on these aforementioned components to operating team of the system 100 to help manage Users and measure improvements for the system 101. Offers 172 may comprise a subcomponent/sub-module of the admin system 170 that communicates with Moment Core 101 to send offers/incentives to Users 105 to register with the system 101 (like offering a free gift to send or a discount on a particular gift) all of which may be tracked and managed directly by Admin System 170.

Financial Institutions 180 may comprise banks and or credit card providers (such as Bank of America or a payment processor like FirstData) and may communicate with Moment Core 101 across the communications network 111 in order for the Gifter 104 to provide financial data 144 (part of profile 141) to be used to purchase a gift or the system 100 my send electronic invoices (i.e. via e-mail) directly when a good or service is exchanged from one entity to another, whether it be between Users 105/Gifters 104/Receivers 106 or from the system 100 to a User 105/Gifter 104/Receiver 106 or with a Content Provider 109.

Figure 2:
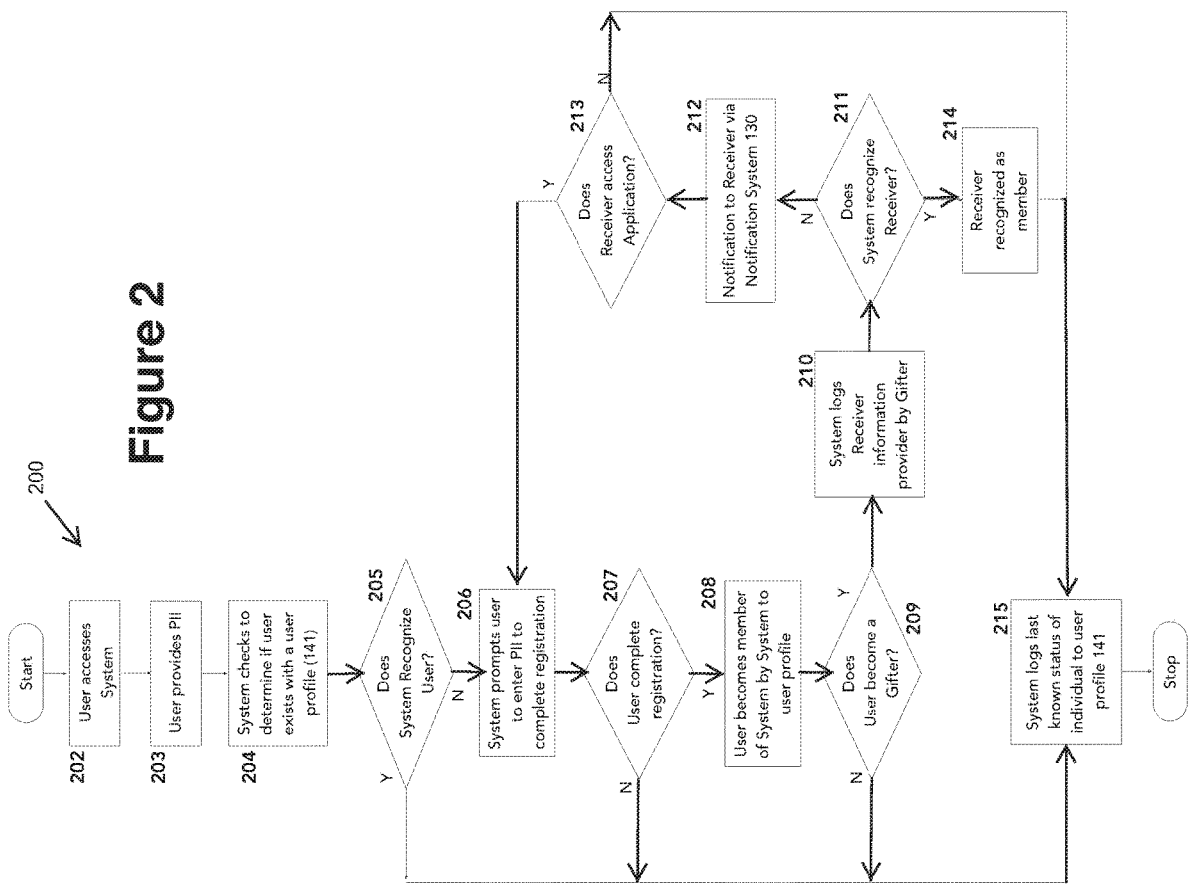
FIG. 2 is a logic flow diagram illustrating an exemplary method for new user registration and unregistered Receiver User registration according to one exemplary embodiment.

Referring now to FIG. 2, this figure is a logic flow diagram illustrating an exemplary method 200 for new user registration and unregistered Receiver User registration according to one exemplary embodiment. A User 105 (which is a portable computing device 105 that may either comprise a mobile phone or laptop/desktop computer) may register with the system 100.

However, it should be noted that a User 105 may not have to register to be known to the system 100 (instances of this are covered within). A User 105 may access the system 100 over the communications network 111 of FIG. 1 in block 202. The User 105 may provide some Personally Identifiable Information "PII" to the system 100 as illustrated in block 203, which is then saved by the moment core 101 to a User Profile 141. PII 149 may include, but is not limited to, financial account information, like a bank account or a credit card (such as American Express, MasterCard, or Visa), a merchant loyalty account (such as a grocery store—Kroger Rewards or a pharmacy retailer store like CVS ExtraCare Rewards Program), social media account (such as Facebook or Twitter), zip code, home address, biometrics (such as a fingerprint or retina scan) or some other means by which the System may use to uniquely identify the User.

This PII may be manually entered on the PCD by the User. Alternatively, the User may instead take an image of the information requested from their PCD using their PCD camera 1275, 1348 (See FIGS. 13-14).

This information may also be used subsequently to charge the User 104 for using the System as a Gifter, inform the Insights Engine 140 based on User behavior, or to collect other information that may be used among other data points collected by the System. Upon providing PII 149 in block 203, in blocks 204 and 205, the Moment Core module 101 may determine whether the User 105 exists and has a User Profile 141. The Moment Core module 101 may recognize a User with PII 149 provided after analyzing the existing records in the User Profile system 141 (see FIG. 1).

The Moment Core module 101 may complete blocks 204 and 205 this by checking against User Profile 141 logs. If the inquiry to decision block 205 is positive, then the "Yes" branch may be followed by the Moment Core module 101 to block 215 in which the Moment Core module 101 may generate a log of this instance of interaction with the User 104. At block 215, the recognized User may not be required to take further action with the system 100 and the method ends.

If the inquiry to decision block 205 is negative, then the Moment Core module 101 follows the "No" branch to block 206 in which the Moment Core module 101 may prompt that User to enter PII 149 in order to register and use the system 100. Next, in decision block 207, the Moment Core module 101 determines if the User 105 has completed registration. If the inquiry to decision block 207 is negative, then the "No" branch is followed to block 215 in which the Moment Core module 101 records that the User's registration was started but is incomplete. The Moment Core module 101 saves the incomplete record in the User Profile system 101 in which the user 105 may log-in at a later time to complete registration.

If the inquiry to decision block 207 is positive, then the "Yes" branch is followed to block 208 in which the Moment Core module 101 identifies the user's credentials (received with the PII 149) as a registered user. Next, in decision block 209, the Moment Core module 101 determines if the user wants to send a gift to a receiver 106. If the inquiry to decision step 209 is negative, then the "No" branch is followed to block 215 in which the Moment Core module 101 logs the registered user status of the new potential gifter 104. The process then ends/stops.

If the inquiry to decision step 209 is positive, then the "Yes" branch is followed by the Moment Core module 101 to block 210 in which the Moment Core module 101 logs the identifying information for the receiver provided by the Gifter 104. The process then continues to decision block 211.

In decision block 211, the Moment Core module 101 will search all user profiles stored in the User Profile system 141 to determine if the intended Receiver 106 is registered with the system 100. If intended Receiver 106 has an existing profile in the User Profile system 141, then the "Yes" branch is followed to block 214 in which the Moment Core module 101 will confirm that the intended Receiver 106 is a recognized user. This status will then be logged by the Moment Core module 101 in the User Profile 141 in block 215.

If the inquiry to decision block 211 is negative, then the "No" branch is followed by the Moment Core module 101 to block 212 in which the Moment Core module 101 may send a notice to the intended Receiver 106 via the Notification System 130. This notification may be delivered by the Notification System 101 to the intended Receiver 106 as an SMS, email, or by some other means in which it is able to alert User 106 that the Gifter 104 is trying to send the Receiver 106 a gift. That notification may contain an invitation to the Receiver 106 to join/become a member of system 101.

In decision block 213, the Moment Core module 101 is determining if the intended Receiver 106 has downloaded one of the software applications [Moment App 107 or Moment Open 108] and plans to register with the system 100. If the inquiry to decision block 213 is positive, then the Moment Core module 101 follows the "Yes" branch to block 206 where the Moment Core module now manages the registration of the intended Receiver 106.

If the inquiry to decision block 213 is negative, then the "No" branch is followed by the Moment Core module 101 to block 215 in which the Moment Core module 101 records the unregistered status of the intended Receiver 106 and the process ends.

Figure 3:
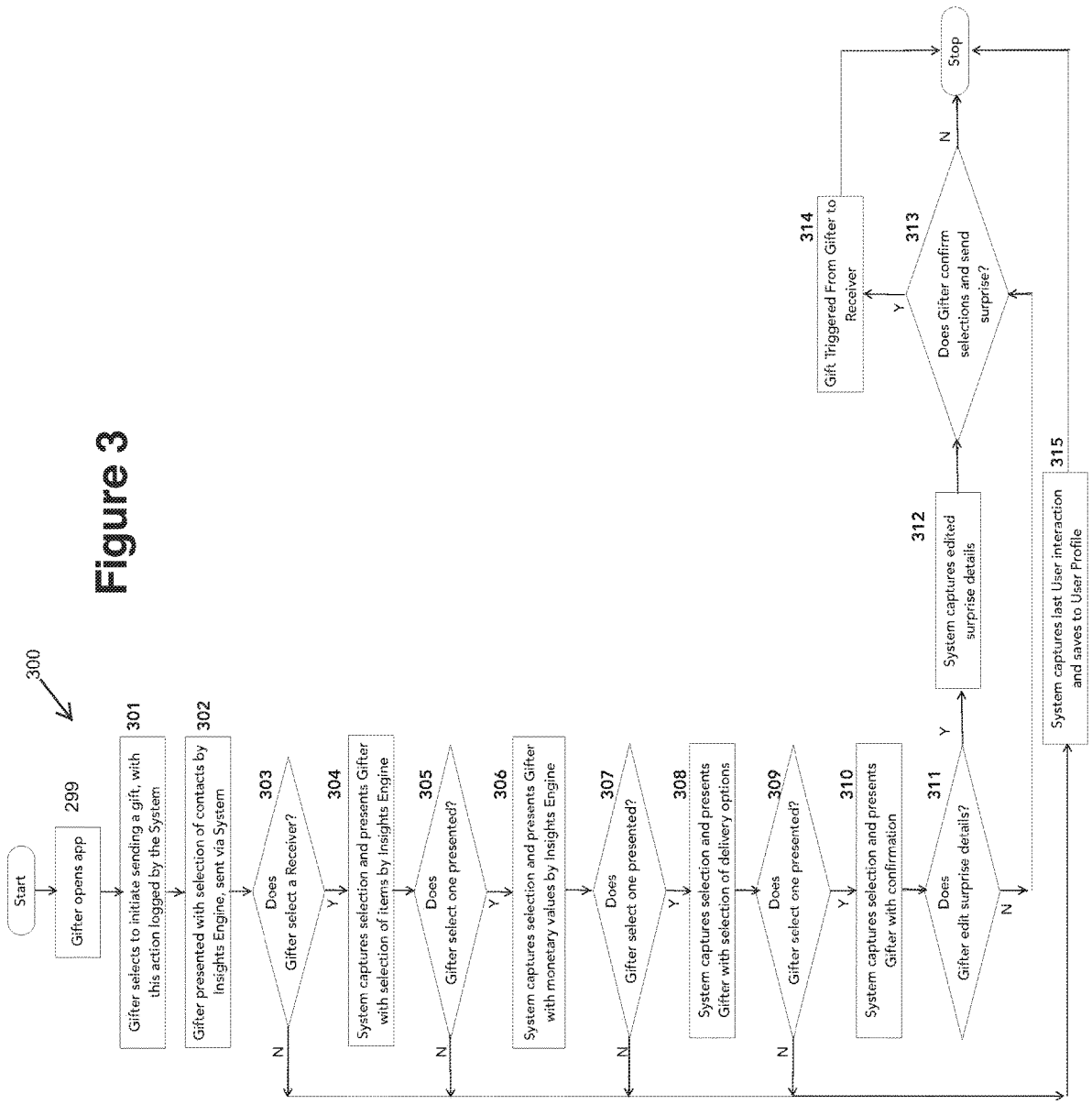
FIG. 3 is a logic flow diagram illustrating an exemplary method for gift recommendation and executing gift redemption according to one exemplary embodiment.

Referring now to FIG. 3, this figure is a logic flow diagram illustrating an exemplary method 300 for gift recommendation and executing gift redemption according to one exemplary embodiment. Several exemplary screen shots illustrated in 9Bxxx will be referenced during this description of the exemplary method 300.

Figures 9A, 9B:
FIGS. 9A-9B are exemplary screen shots of a portable computing device running software that include Push Notifications according to exemplary embodiments.

In block 299, a Gifter 104 will access the system 100 and send a message to the Moment Core module 101. Alternatively, the Notification System 130 will alert the Gifter 106 with a message "Z" in exemplary screen shot 1032 of FIG. 9B. Screen shot 1032 illustrates a calendar running on the PCD of Gifter 104 and which is monitored for events by Notification System 130. In the exemplary embodiment illustrated in FIG. 9B, the Notification System 130 identified a potential Receiver 106 of the Gifter 104 based on a meeting that was scheduled in the calendar and in which the Receiver 106 was listed as one of the meeting participants.

Referring back to FIG. 3, in block 301, the Gifter 104 may start the process of selecting a gift for a Receiver 106. Referring now to the screen shot 1010 of FIG. 7A, this figure illustrates a screen that may be presented when the Gifter 104 opens the moment app 107 running on a mobile phone. When the Gifter 104 selects element 'A' of screen shot 1010, which is a on-screen button with words "Send a Moment" on the System interface, the Gifter 104 may continue on to the next screen shot 1011 of FIG. 7B.

FIG. 7B corresponds with block 302 of FIG. 3. In block 302 and as illustrated in FIG. 7B, the Gifter 104 is presented with a list "B" of contacts that were automatically selected by the Moment Core module 101 working with the Notification System 130 and the Profile System 141. For example, for potential Receiver 106 of Philip West, the Moment Core module 101 determined that this person was traveling a distance to attend a meeting with the Gifter 104. For the potential Receiver 106 of Bill Lamarr, the Moment Core module 101 determined that this person is celebrating an anniversary in one calendar week.

Instead of the Gifter 104 deciding which potential Receiver 106 to select, the Gifter may select option "C" of screen shot 1011 and let the Moment Core module 101 determine which contact of the Gifter 104 to select as the intended Receiver 106 of a gift.

Referring back to FIG. 3, in decision block 303, the Moment Core module 101 determines if the Gifter 104 has selected a contact to be a Receiver 106 such as one of the contacts as presented in the list of screen shot 1011 of FIG. 7B. If the inquiry to decision block 303 is negative, then the "No" branch is followed to block 315 in which the Moment Core module 101 captures the last Gifter interaction and saves it to the profile stored in the Profile System 141. The process then ends.

If the inquiry to decision block 303 is positive, then the "Yes" branch is followed by the Moment Core module 101 to block 304 in which the Moment Core module 101 records the selection of the contact as the intended Receiver 106 and then presents the Gifter 104 with potential gifts for the intended Receiver 106 based on an analysis by the Insights Engine 140.

During block 304, the Moment Core module 101 verifies if the intended Receiver 106 has an existing profile in the Profile System 141. If the Receiver 106 is not a known member, the Moment Core module 101 via the Notification System 130 may send a notification to that individual (such as through SMS and/or email) with instructions to become a member as previously noted above and illustrated in FIG. 2. If the intended Receiver is already a member of the system 100, no sign-up notification is needed. The Insights Engine 140 determines Gift Defaults 151 to present to Gifter 104, such as those illustrated in FIG. 7C which is a screen shot 1012. Screen shot 1012 of FIG. 7C provides a list of Gift Defaults 151 for the contact of Philip which was selected by the Gifter 104 in FIG. 7B.

The Insights Engine 140 after analyzing the profile for the Receiver 106 of Philip in the Profiles System 101 determined that Philip desired the following gifts: a baseball cap "E", drinks, home cleaning services, dinner, a movie, or clothing as his preferred gifts. For baseball cap "E," the Insights Engine 140 reviewed wishlists that the Receiver 106 of Philip maintained on one of his on-line store databases, such as Amazon brand of on-line stores. The Receiver 106 of Philip had flagged the baseball cap as a potential purchase that he might make in the future.

Referring back to FIG. 3, next in block 305, the Moment Core module 101 determines if a gift has been selected. If the inquiry to decision block 306 is negative, then the "No" branch is followed to block 315 in which this action is recorded in the Gifter's profile. The process then ends.

If the inquiry to decision block is positive, then the "Yes" branch is followed to block 306 in which options for the monetary value of the selected gift are displayed by the Moment Core module 101. See FIG. 7D in which the "Drinks for Philip" option was selected from FIG. 7C. FIG. 7D illustrates a screen shot 1013 that provides options G, H, I, J, and K for the Gifter 104 to select with respect to monetary value for a drink gift for Philip. Option G allows the Gifter 104 to select a monetary amount from a drop down menu. Option H allows the Gifter 104 to enter in a customized monetary value for the gift.

Option I of FIG. 7D allows the Gifter 104 to designate no limit on money for this gift. Option J allows the Gifter 104 to let the Moment Core module 110 to decide on the monetary amount. And Option K allows the Gifter 104 to select a range of monetary value such as up to ten U.S. dollars ($10 U.S. Currency) and up to fifteen U.S. dollars ($15 U.S. Currency). These amounts are exemplary only and other amounts may be used/employed as understood by one of ordinary skill in the art.

Referring back to FIG. 3, next in decision block 307, the Moment Core module 307 determines if a monetary amount has been selected by the Gifter 104. If the inquiry to decision block 306 is negative, then the "No" branch is followed to block 315 in which this action is recorded in the profile of the Gifter 104. The process then ends.

If the inquiry to decision block 307 is positive, then the "Yes" branch is followed to block 308 in which the Moment Core module 101 presents the Gifter 104 with a list of delivery options, such as those illustrated in FIG. 7E.

In FIG. 7E, an exemplary screen shot 104 is illustrated which lists at least three delivery options L, M, and N for the gift which was selected in screen shot 1013 of FIG. 7D. These delivery options may include, but are not limited to, option L—"in the perfect moment" in which the Moment Core module 101 determines when the Receiver 106 plans to transmit money that may correspond with the gift 153 that was selected by the Gifter 104. Option M may include "Immediately" where the Moment Core module 101 may send a notice using the delivery system 130 to deliver the gift 153 immediately and sent a note with the gift information to the Receiver 106. Option N may allow the Moment Core module 101 to decide the right "time" or "moment" for delivery by monitoring activity of the Receiver 106. The Moment Core module 101 using the insights engine 140 may determine timing for delivery of the gift 153 by reviewing context information available to the insights engine.

Referring back to FIG. 3, in decision block 309, the Moment Core module 101 determines if the Gifter 104 has selected one of the gift delivery options (L, M, or N of FIG. 7E). If the inquiry to decision block 309 is negative, then the "No" branch is followed to block 315 in which this action is recorded in the profile of the Gifter 104. The process then ends.

If the inquiry to decision block 309 is positive, then the "Yes" branch is followed to block 310 in which the Moment Core module 101 captures the selected delivery option and provides confirmation of the selection, such as illustrated in FIG. 7F that includes screenshot 1015. The information presented in screenshot 1015 is generated when the Gifter 104 selects the "In the perfect moment" delivery option in screenshot 1014 of FIG. 7E. If the Gifter 104 had selected the "immediately" delivery option in screenshot 1014 of FIG. 7E, then screenshot 1015 would display "immediate delivery selected" message.

"In the perfect moment" screenshot 1015 of FIG. 7F allows the Gifter 104 to select various options for the surprise delivery, such as, but not limited to, the value of the gift, the location of the gift (i.e. what particular business— i.e. a bar for drinks), the date/day of the surprise delivery, and even a time of day as desired. The Gifter 104 may also allow the Receiver 106 to keep any excess value of the gift—i.e.—for an "up to $10 drink gift" may allow the Receiver 106 to retain the remaining value should the Receiver 106 spend less than the allotted gift amount (i.e.—$6 was spent when $10 was allotted by Gifter 104).

In decision block 311, the Moment Core module 101 determines if the Gifter has edited the surprise gift 153 details. If the inquiry to decision block 311 is negative, then the "No" branch is followed to decision block 313.

If the inquiry to decision block 311 is positive, then the "Yes" branch is followed to block 312 in which the Moment Core module 101 records any changes/selections to screenshot 1015 of FIG. 7F. The process then continues decision block 313.

In decision block 313, the Moment Core module 101 confirms the selections made in screenshot 1015 of FIG. 7F. If the inquiry to decision block 313 is negative, then the "No" branch is followed in which the Gifter 106 has cancelled the gift 153 and the process then ends.

If the inquiry to decision block 313 is positive, then the "Yes" branch is followed to block 314 in which the Moment Core module 101 records sends messages to the Fullfillment System 160 about the gift 153 and presents the Gifter 104 with a "Gift success message" screenshot 1016 of FIG. 7G.

Figure 4:
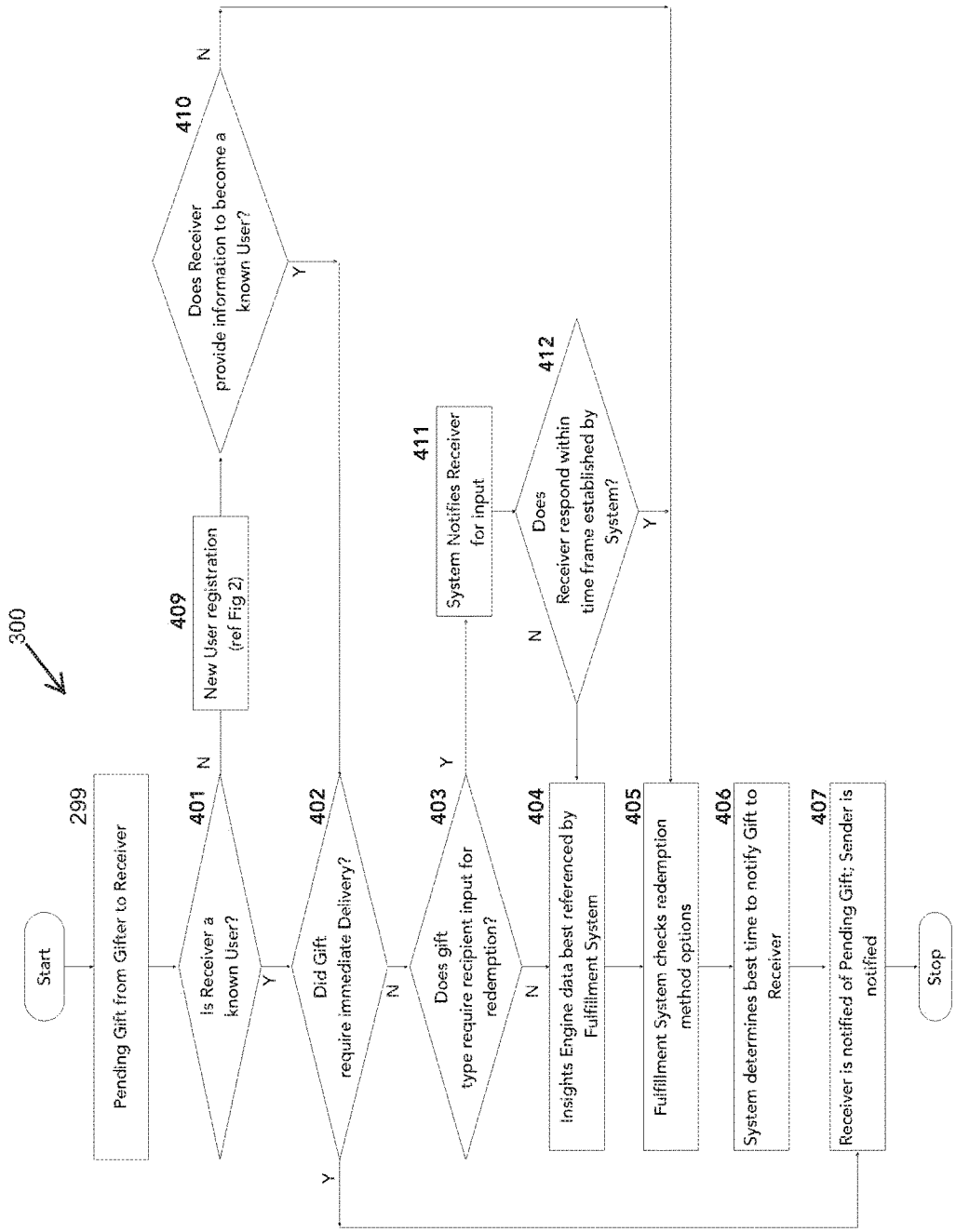
FIG. 4 is a logic flow diagram illustrating an exemplary method of the Notification System of FIG. 1 determines how to notify a Receiver of a Pending Gift according to one exemplary embodiment.

Referring now to FIG. 4, this figure is a logic flow diagram illustrating an exemplary method 400 on the Notification System of FIG. 1 determining how to notify a Receiver 106 of a Pending Gift 153 according to one exemplary embodiment. Block 299 is the first step in which the Moment Core module 101 recognizes there is a Pending Gift 153. Next, in decision block 401, the Moment Core module 101 checks Insights Engine 140 for User Profiles 141 to determine whether Receiver 106 is known to the system.

Should a Receiver 106 not be recognized by Moment Core 101 [the "No" branch from decision block 401], the un-recognized Receiver 106 may be required to move through User registration as previously covered and illustrated in FIG. 2 as shown in block 409. In decision block 410, the Moment Core module 101 determines if the Receiver 106 provides the requested information for registering with the system 100. If the inquiry to decision step 410 is negative, then the "No" branch is followed to block 405 where the Fulfillment System 160 may determine the best method to ensure that the intended gift is delivered to that Receiver 106 based on the limited information that may have been provided in decision block 410. This is covered in more detail and directly referenced in the explanation for FIG. 5.

Should Receiver 106 provide adequate information or should the Moment Core module 101 recognize Receiver 106, the "Yes" branch from decision block 410 is followed to decision block 402, where the Gift System 150 confirms with whether Gifter 104 selected to deliver Pending Gift 153 immediately.

Should Fulfillment System 160 detect that Pending Gift 153 is required to deliver immediately to Receiver 106 [the "Yes" branch from decision block 402], then the Notification System 130 may then send a notice to Receiver 106 (such as SMS or push notification) in block 407. In this instance, no additional System or Server check is required to determine how Receiver 106 will be notified of the Pending Gift 153

Should the Fulfillment System 160 not have a command to deliver immediately [the "No" branch from decision block 402], then it may check to see if any input from Receiver 106 is required to fulfill Pending Gift 153 as set forth in decision block 403. If no input is deemed required [the "No" branch exiting decision block 403], then the Fulfillment System 160 may send a search request/inquiry to the Insights Engine 140, which may include Receiver User Profile 141 as set forth in block 404.

In at decision block 403, the Fulfillment System 160 determines it is required to ask for information from Receiver 106 [the "Yes" branch exiting decision block 403], then in block 411, the Notification System 130 will prompt the Receiver 106 for required information (such as mailing address, office address, email, phone number, zip code, preferred shopping center, preferred merchants, or some other data that may be needed to deliver Pending Gift 153).

Receiver 106 in block 411 may be able to enter/input preferences directly with Moment App 107 via their PCD, be able to send an electronic communication back to Notification System 130 (such as SMS text or email), among other means to communicate the required information via Moment Open 108. Moreover, Receiver 106 in block 411 may be able to enter his/her own request or preference directly on their PCD, such as a mobile phone.

Next, in decision Block 412, the fulfillment system determines if the Receiver 106 has exceeded a predetermined time period for providing the requested information. This predetermined time period may be set by an administrator of the system 100. Exemplary time periods would include, but are not limited, to five to ten minutes. If the Receiver 106 does not respond or fails to input required information at decision block 412, then the "No" branch is followed to block 404, where the Fulfillment System 160 may check the Insights Engine 140 for data to help determine the best delivery option.

For instance, the Insights Engine 140 may have an email address for Receiver 106 that would enable Fulfillment System 160 to send a notification via Notification System 130 about the delivery of their Pending Gift 153.

Figure 5:
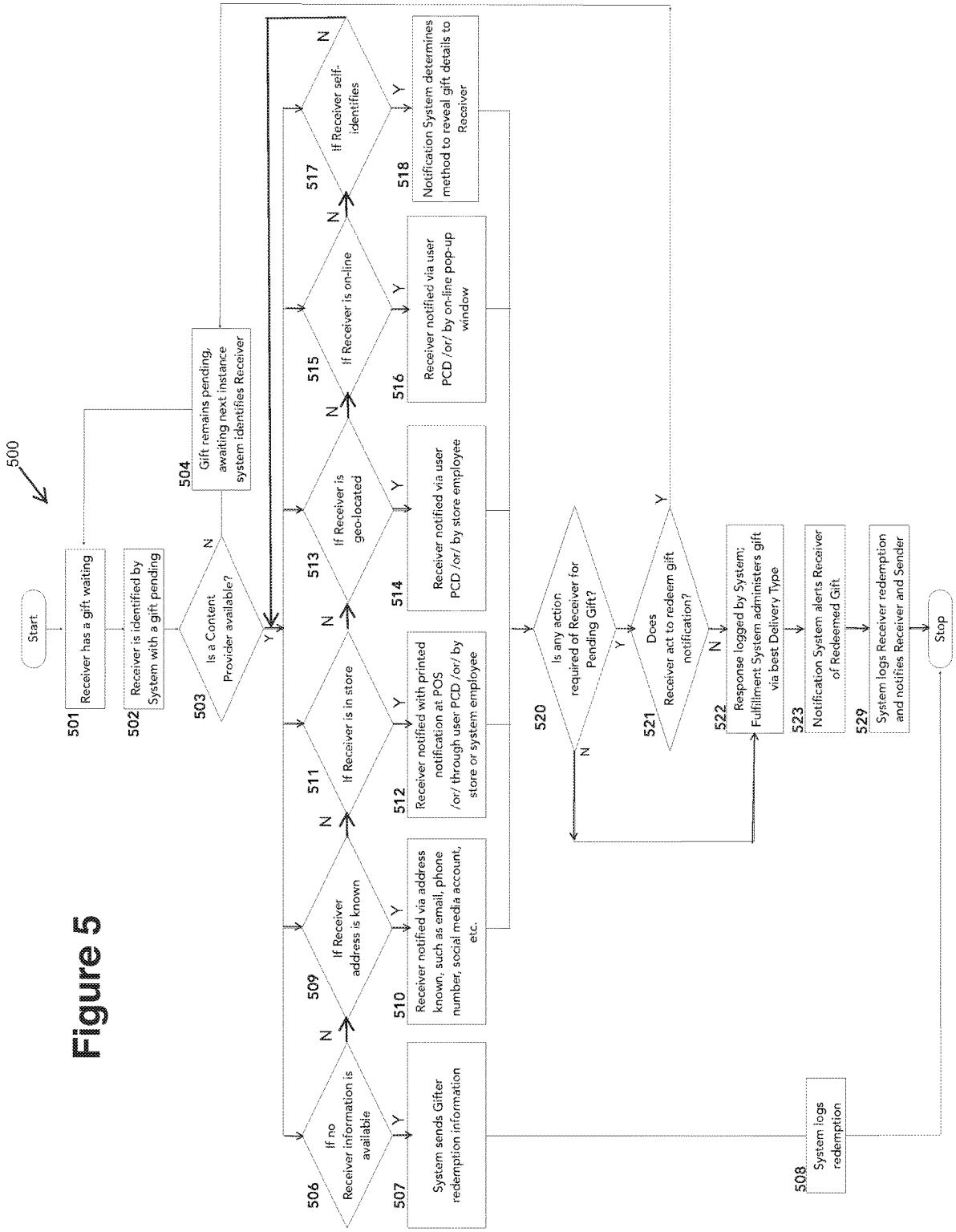
FIG. 5 is a logic flow diagram illustrating an exemplary method for providing Receiver Notification at the point of sale/transaction, upon geo-location, on-line, or by self-identification according to one exemplary embodiment.
Figure 6:
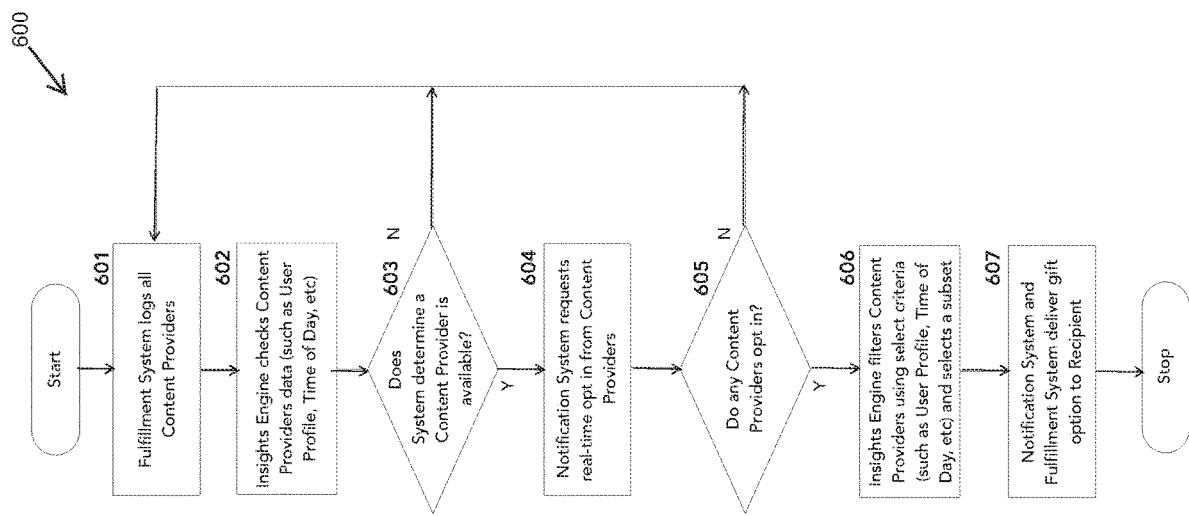
FIG. 6 is a logic flow diagram illustrating an exemplary method of how the Insights Engine of FIG. 1 determines best redemption option for Fulfillment System according to one exemplary embodiment.

Delivery options and protocol will be explained in greater detail following the description of FIG. 4, since one main purpose of the method 400 illustrated in FIG. 4 is providing a notification of Pending Gift 153 to Receiver 106. FIGS. 5 and 6 described below contain specific delivery scenarios for Fulfillment System 160.

In block 405 of FIG. 4, Fulfillment System 160 checks available delivery options provided (and explained below in greater detail and illustrated in FIGS. 5 and 6 with specific scenarios for consideration). Next in block 406, the Fulfillment System 160 determines a "best" or most ideal time to notify the Receiver 106 based on specific criteria associated with the Pending Gift 153 within Insights Engine 140, and Gift System 150 [explained in greater detail below and illustrated in FIG. 5 with specific scenarios for consideration].

In block 407, upon filtering all available inputs, Notification System 130 alerts Receiver 106 of the Pending Gift 153 and alerts Sender 104 that Pending Gift 153 is now a Redeemed Gift 154 [explained in greater detail below and illustrated in FIG. 5 with specific scenarios for consideration]. After block 407, the method 400 ends.

As one example for FIG. 4, consider Gifter 104 selects to allow the Moment Core module 101 to determine delivery (as illustrated in FIG. 7E, screenshot 1014, element 'N' and block 403 'No' path). This determination may happen when the Receiver 106 visits a retailer corresponding to Gift System 150 criteria and is identified by the Moment Core module 101. For instance, Receiver 106 may have a Pending Gift 153 that is to be delivered at a women's department store. Insights Engine 140 criteria would be accessed to determine if Receiver 106 has women's department store preferences logged. If Receiver 106, for instance, previously indicated they do not like Macy's, the Fulfillment System 160 would eliminate Macy's as a Content Provider 109 option.

Alternatively, if Insights Engine 140 has a log that Receiver 106 last redeemed at a particular women's department store (like Macy's), then that specific Content Provider 109 may be eliminated as an option to ensure the Receiver 106 is served a unique Content Provider 109 for their next redemption experience. This input from Insights Engine 140 and Content Provider 109, filtered by Fulfillment System 160, is exemplified in FIG. 4, and specifically blocks 404, 405, and 406. Additional scenarios of Receiver 106 identification and redemption are covered in detailed flows below and further exemplified in FIG. 5.

Alternatively, a determination for notification may occur if Receiver 106 engages in some other corresponding act to initiate the delivery of the Pending Gift 153 (like using their credit card or retailer loyalty card known to the System) where the retailer corresponds to Gift System 150 criteria, Insights Engine 140 criteria and input from Content Provider 109 filtered by Fulfillment System 160 as exemplified in FIG. 4, and specifically in blocks 404, 405 and 406 of method 400. This latter delivery method serves as an absolute and pure surprise in the moment of a transaction and addresses the core problems associated with receiving a gift.

By a receiving a gift occurring in the moment of transaction, there is no effort the Receiver 106 must take to redeem or receive the gift intended for them as they had already initiated the purchase under their own volition and with no prompt by the System. Furthermore, should this latter method be enacted by the system 100, both the Gifter 104 and the Receiver 106 may be notified following the redemption via Notification System 130 as exemplified in FIG. 8A, screenshot 1021 element 'A' and in FIG. 8C, screenshot 1023 element 'Z'.

Figure 8A:
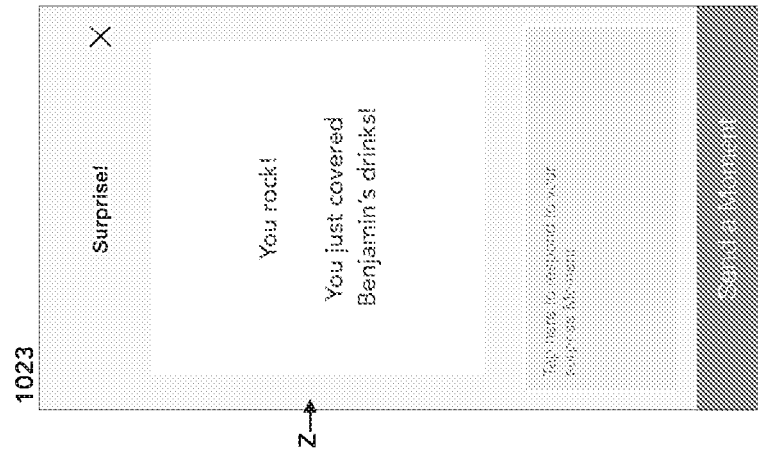
FIGS. 8A-8C are exemplary screen shots of a portable computing device running software that facilitates the receipt of an element for a Receiver and enables optional feed back to the Gifter according to exemplary embodiments.

FIG. 8A illustrates a notification to the Receiver 106 and is based on the prior example described in connection with FIG. 3 where the drinks gift for the Receiver 106 of Philip was selected. When the Receiver 106 goes to pay for drinks with his PCD, then screenshot 1021 of FIG. 8A may be presented. The Receiver 106 is also provided with the option to send a moment/gift 153 in response to receiving the current gift 154 as indicated by the screen button presented at the bottom of the page/screenshot 1021.

Figure 8B:
Figure 8C:
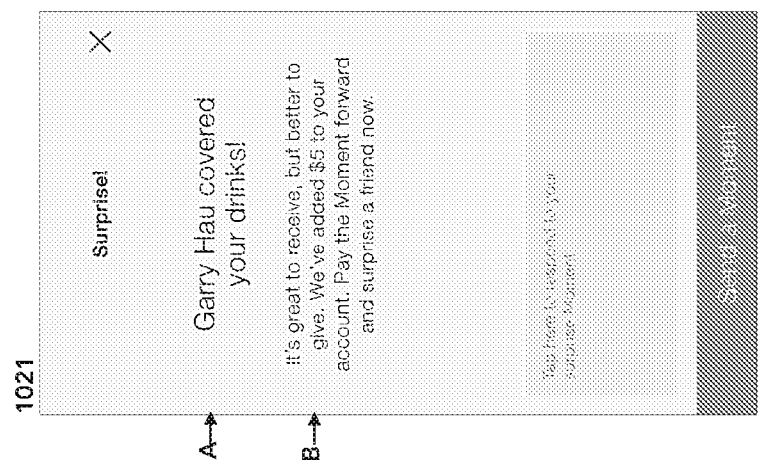

FIG. 8C illustrates the notification provided to the Gifter 104 when the drinks gift described in FIG. 8A and FIG. 3 is redeemed by the Receiver 106 of Philip. The notification in screenshot 1023 congratulates the Gifter 104 and explains which gift was transferred and who the Receiver 106 of the gift is.

In view of FIGS. 8A & 8C, all problems attributed to receiving a gift have been eliminated, including optimal time of delivery for the Receiver 106, having to remember a Pending Gift 153 is waiting [has not been sent], and closing the communication loop back to the Gifter.

FIG. 5 is a logic flow illustrating an exemplary method 500 for providing Receiver Notification at the point of sale/transaction, upon geo-location, on-line, or by self-identification according to one exemplary embodiment. Block 501 is the first step of method 500. In FIG. 5, methods and instances in which a Receiver 106 are notified and how a Pending Gift 153 may be delivered are varied and determined by the various components of Moment Core module 101 as will be explained below.

The notification and delivery may occur at the same time or may be separated in time. Notifications are determined by the Insights Engine140, Notification System 130, and Fulfillment System 160, all of which generate inputs to Moment Core 101. Notification types vary based on information of the Receiver 106 gathered by Insights Engine 140, gift criteria logged by Gift System 150 and available Content Providers 109 logged by Fulfillment System 160.

Referencing FIG. 5, in block 501, the Fulfillment System 160 first recognizes that a Receiver 106 has a Pending Gift 153 (i.e.—one that has been selected for delivery by the Gifter 104 as described above). In block 502, the Moment Core module 101 then identifies the Receiver 106 via data from the User Profiles system 141 with this identification being directly related to the logic flow of FIG. 2 in which the system 100 has taken previous action to identify Receiver 106.

The flow of FIG. 5 accounts for a known Receiver 106 to the system 100. Delivery to an unknown Receiver has been discussed previously. Should a Receiver 106 not be identified by Moment Core module 101 as a registered User 105 and should the Receiver 106 not subsequently register if prompted via the Notification System 130, the Fulfillment System 160 may use other means to identify the Receiver 106 and deliver the intended Pending Gift 153.

This information about an unregistered Receiver 106 may include phone number, social media activity received from the Gifter 104, input by a human administrator of system 100, sending the Pending Gift 153 directly to the Gifter 104 so the Gifter 104 may share it with their intended Receiver 106, or some other means to ensure the Pending Gift 153 is delivered.

Should no appropriate means exist to deliver Pending Gift 153 to Receiver 106, the Fulfillment System 160 may instead refund the purchase or not charge Gifter 104, thereby removing the Pending Gift 153 for the intended Receiver 106. The Notification System 130 may then send a notification to Gifter 104 of this action, with all actions logged to the profile stored in the User Profile system 141 for the Gifter 104.

Now, referring back to the logic flow of FIG. 5, in decision block 503, the Fulfillment System 160 determines if a Content Provider 109 is available for Pending Gift 153 to an identified Receiver 106. Should Fulfillment System 160 not identify an available Content Provider 109 [the "No" branch exiting decision block 503], it will then determine not to notify a Receiver 106 in block 504. A Pending Gift 153 remains attributed/assigned to that Receiver 106, awaiting the next instance the Fulfillment System 160 may determine whether the Receiver 106 should be notified. The flow continues to decision block 521 described in further detail below.

If the content provider is available [the "Yes" branch exiting decision block 503], the following decisions [decision blocks 506, 509, 511, 513, 515, and 517] may be made/reviewed/processed in parallel by the Fulfillment system 160. If anyone of inquiries to decision blocks 506, 509, 511, 513, 515, and 517 is positive, then a respective "YES" branch is followed in response to that positive inquiry.

So, following the "Yes" branch from decision block 503 [meaning a content provider is available for the pending Gift 153] to decision block 506, the Fulfillment system 160 in block 506 determines if the Receiver 106 has any known identifiable information available. If the inquiry to decision block 506 is negative, then the "No" branch is followed to decision block 509.

If the inquiry to decision block 506 is positive, then the "Yes" branch is followed to block 507. In block 507, the Fulfillment System 160 may employ Notification System 130 to send a notification with redemption instruction to Gifter 104 for that person to subsequently share with their intended Receiver 106. This scenario would indicate that Insights Engine 140 holds no logs or information available to identify the Receiver. Next, in block 508, the Fulfillment System 160 would then log the Pending Gift 153 as a Redeemed Gift 154 as indicated by block 508. The process then ends at this stage.

Referring back to decision block 503 of FIG. 5, following the "Yes" branch from decision block 503 [meaning a content provider is available for the pending Gift 153] to decision block 509, the Fulfillment system 160 determines in block 509 if the Receiver 106 has a known address (i.e.—mailing address, e-mail address, social media account, phone number, etc.) in the Profiles System 141. If the inquiry to decision block 509 is negative, then the "No" branch is followed to decision block 511.

If the inquiry to decision block 509 is positive, then the "Yes" branch is followed to block 510. In block 510, the Fulfillment System 160 determines that the Receiver 106 should be notified. This address may be a physical, digital, or some other property by which Receiver 106 is able to receive some notification by Notification System 130, as described above with respect to data stored in the User Profile system 141. The method 500 then continues to block 520 which will be described in further detail below.

Referring back to decision block 503 of FIG. 5, following the "Yes" branch from decision block 503 [meaning a content provider is available for the pending Gift 153] to decision block 511, the Fulfillment system 160 determines in block 511 if the Receiver 106 is located in a store (i.e. currently shopping). If the inquiry to decision block 511 is negative, then the "No" branch is followed to decision block 513.

If the inquiry to decision block 511 is positive, then the "Yes" branch is followed to block 512. In block 512, the Receiver may be notified with a printed receipt at the Point of Sale (POS) 131, through the Receiver's PCD, verbally by a store employee who receives an electronic message from the Fulfillment system 160, or some other means. The method 500 then continues to block 520 which will be described in further detail below.

Referring back to decision block 503 of FIG. 5, following the "Yes" branch from decision block 503 [meaning a content provider is available for the pending Gift 153] to decision block 513, the Fulfillment system 160 determines in block 513 if the Receiver 106 can be geo-located (potentially via Location data 148 of Receiver 106 filtered by the Insights Engine 140—i.e. with GPS signals from his/her PCD). If the inquiry to decision block 513 is negative, then the "No" branch is followed to decision block 515.

If the inquiry to decision block 513 is positive, then the "Yes" branch is followed to block 514. In block 514, the Fulfillment system 160 may send an electronic message to the Receiver 106 (i.e. his/her PCD) and/or to a PCD of a store employee if the Receiver 106 is found to be located within a store. The method 500 then continues to block 520 described in further detail below.

Referring back to decision block 503 of FIG. 5, following the "Yes" branch from decision block 503 [meaning a content provider is available for the pending Gift 153] to decision block 515, the Fulfillment system 160 determines in decision block 515 if the Receiver 106 is on-line, whether with a mobile phone or laptop/tablet PC—via a PCD. If the inquiry to decision block 515 is negative, then the "No" branch is followed to decision block 517.

If the inquiry to decision block 515 is positive, then the "Yes" branch is followed to block 516. In block 516, the Receiver 106 may be notified via the Receiver's PCD or through an online pop-up window, among other means. The method 500 then continues to block 520 described in further detail below.

Referring back to decision block 503 of FIG. 5, following the "Yes" branch from decision block 503 [meaning a content provider is available for the pending Gift 153] to decision block 517, the Fulfillment system 160 determines in decision block 517 if the Receiver 106 has self-identified. A Receiver 106 may self-identify to the Moment Core module 101 (such as by texting the system 100 via SMS or alerting a Content Provider 109, a store employee, among other possible methods a Receiver 106 may take to identify/check-in with the system 100). If the inquiry to decision block 517 is negative, then the "No" branch is followed back to decision block 503.

If the inquiry to decision block 517 is positive, then the "Yes" branch is followed to block 518. In decision block 518, the Fulfillment System 160 determines the optimal method of gift redemption, which may include previously mentioned methods of notification for Pending Gift 153. The method 500 continues to block 520.

In decision block 520, the Fulfillment System 160 determines if any action is needed from the Receiver 106 for the pending gift 153. If the inquiry to decision block 520 is negative, then the "No" branch is followed back decision block 522.

If the inquiry to decision block 520 is positive, then the "Yes" branch is followed to decision block 521. In decision block 521, the Fulfillment System 160 determines if any action is needed from the Receiver 106 to receive notice of the pending gift 153. If the inquiry to decision block 521 is positive, then the "Yes" branch is followed back decision block 504 described above.

If the inquiry to decision block 521 is negative, then the "No" branch is followed to block 522. In block 522, the Fulfillment System 160 logs the response of the Receiver 106 to the gift notification and determines the best delivery method. In block 523, the notification system 130 alerts the Receiver 106 of the redeemed gift 154. In block 529, the Fulfillment System 160 logs/records the receiver redemption and then notifies the Receiver 106 and Gifter 104 of the redeemed Gift 154. The method 500 then ends.

The following are a few additional examples of Method 500 and how a notification may be triggered by Notification System 130 to a Receiver 106. The Receiver 106 may be notified with the delivery of the gift at a Content Provider 109 (i.e.—like a store location) simultaneously as they attempt to pay for their selected element with their credit card, which may be recognized via User Financial Data 144. In this instance, the Notification System 130 simultaneously notifies Receiver 106 of a Pending Gift 153 while Fulfillment System 160 delivers the intended Pending Gift, as exemplified in blocks 520 (as no action is required by the Receiver upon notification), 522 (the Fulfillment System 160 logs the interaction and administers the Pending Gift 153) and 523 (Receiver 106 is alerted of Redeemed Gift 154). This serves as an example of the previously mentioned Intercept 163 fulfillment method.

Referring again to FIG. 5, the system 100 may send a notification via Notification System 130 to the Receiver 106 alerting that there is a gift in waiting, but withhold information on the type of gift (i.e.—the gift is for Fine Dining and this fact is not shared with the Receiver 106). In this instance, Receiver 106 would receive the gift at the time deemed best when they are within a recognized Fine Dining experience (i.e.—about to pay at a restaurant by providing credit card information to the restaurant). A subsequent notification would then accompany the delivery of the Redeemed Gift 154, as exemplified in block 523. This example serves to explain instances in which a Receiver 106 may be identified in-store or self-identify (such as sharing credit card info with a restaurant), via geo-location, and on-line (like through the Insights Engine 140 referencing User Profile 141 data of a restaurant reservation made through OpenTable.com).

Following the notification of a Pending Gift 153 to Receiver 106, some action may be required by the Receiver 106 (such as selecting a preferred Content Provider 109 or preferred delivery type via Fulfillment System 160) to have their gift delivered, as exemplified in decision block 520, following a positive inquiry (i.e.—the "Yes" branch from decision block 520).

At this point, the Fulfillment System 160 monitors whether any action or response is received from Receiver 106, as indicated with decision block 521. Should no response be received by Notification System 130 [the "No" branch exiting decision block 521], then in block 504, the Pending Gift 153 remains for Receiver 106 and would be filtered by Moment Core 101 at some other time for notification and delivery in the future.

However, if the Receiver 106 does provide a required response that is logged by Notification System 130 [the "Yes" branch exiting decision block 521], then in block 522 Fulfillment System 160 then determines the method for which the Pending Gift 153 is to be delivered.

As described above in connection with decision block 521, an action may be required by Receiver 106 for the Gift System 150 to log a Pending Gift 153 as a Redeemed Gift 154. The Gifter 104 may make this requirement for a Pending Gift 153. Should no confirmation be required [the "No" branch exiting decision block 521], the Notification System 130 may alert Sender 104 and Receiver 106 of the Redeemed Gift 154 status, which has been logged by the Moment Core 101 and information saved by Insights Engine 140 of both Sender and Receiver User Profiles 141 for future reference, and exemplified in block 529.

At this stage, the Feedback Loop 135 mentioned in FIG. 1 has been fulfilled. As illustrated in screen FIG. 8A, screenshot 1021, element 'A' and in screenshot 1023 of FIG. 8C, element 'Z.' The Notification System 130 may also prompt the Receiver 106 to alert the Gifter 104 that the gift has been redeemed or received. This alert may transpire on the Receiver's PCD 106 as a separate notification, or may accompany the gift, among other methods.

For instance, if a Receiver 106 is at a Fine Dining establishment and the dinner is paid in full, the Receiver may be notified by an employee of that dining establishment of the gift who may provide a self-addressed "thank you" card for the Receiver 106 to sign. This may subsequently then be mailed by the establishment to the Gifter 104. Alternatively, the Receiver 106 may be able to respond through the Notification System 130 by SMS, video message captured by their PCD, pictograph emoji (like a smiley face), by sending a gift of their own, among other methods. The result of which is represented with FIG. 8B, screenshot 1022, element 'N' which is a photograph taken by the Receiver 106 during the gift "moment."

If the Receiver 106 is required to provide confirmation of receipt of Pending Gift 153 and does not do so during a time frame established by the Fulfillment System 160, a subsequent notification may be issued via Notification System 130. Otherwise, the Fulfillment System 160 may continue to monitor and determine another time to notify the Receiver, at which point a notification would be issued via Notification System 130. Notifications remove the burden and risk from the Receiver 106 of forgetting they have a gift.

Referring now to FIG. 6, this figure is a logic flow illustrating an exemplary method 600 of how the Insights Engine 140 of FIG. 1 determines the best redemption option for the Fulfillment System 160 according to one exemplary embodiment. In block 601, the Fulfillment System 160 logs all Content Providers 109 available to the system 100. In step 602, the Insights Engine 140 then filters Content Providers 109 based on select criteria (which may include User Profile 141, Date and Time 1402, Location 148, etc.) available to the Fulfillment System 160.

This output is then used by the Fulfillment System 160 in decision block 603 to determine which Content Providers 109 are available for the specific Pending Gift 153 redemption. If the inquiry to decision block 603 is positive, then the "Yes" branch is followed to block 604. If the inquiry to decision block 603 is negative, then the "No" branch is followed back to block 601.

In block 604, the Notification System 130 may notify Content Providers 109 of the Pending Gift 153 with a request in decision block 605 to opt in to activate the Content Provider 109 for a Pending Gift redemption. Content Providers 109 may be always opted in to the Fulfillment System 160, may place a bid on a particular gift redemption, or identify interest some other way such that the Content Provider is activated for a particular Pending Gift 153 redemption. If the inquiry to decision block 605 is negative, then the "No" branch is followed back to block 601.

If Content Providers 109 are available and "opt-in" [the "Yes" branch exiting decision block 605], the the Fulfillment System 160 in block 606 filters available and active ("opt-in") Content Providers to a subset that may be presented to the Receiver 106. In this instance, the Receiver 106 may be sent a notification via Notification System 130 with a selection of a subset of Content Providers 109 to choose from in block 607.

For instance, if Receiver Location 148 is known, the Fulfillment System 160 may generate a subset and only provide the five closest Content Providers 109 as options to select from. Additionally, should some Content Providers 109 be closed for the day at the time of this check, but others are shown to be open, then those that are open may be presented as a subset of options regardless of their distance to Receiver 106.

If the Receiver 106 makes a selection, the Fulfillment System 160 would then act to redeem the Receiver 106 Pending Gift 153 based on their selection. Alternatively, Fulfillment System 160 may bypass the Receiver 106 and pre-select a Content Provider 109 and notify the Receiver directly about the gift redemption as explained in connection with FIG. 4 blocks 404, 405, 406 and 407 as previously described. A notification is then sent to Receiver 106 via Notification System 130 when Insights Engine 140 and Fulfillment System 160 determine the best time to send that notification in block 607 and previously commented above and also described in connection with block 406 of FIG. 4. Additionally, Receiver 106 may be able to request a specific, yet unlisted, Content Provider 109. At which point, the Moment Core module 101 would check Content Provider 109 logs to determine whether that specific Content Provider may serve as an option from which Receiver 106 may select.

Methods in which notifications may be delivered to the Receiver 106 are also varied. Specific notifications have been mentioned previously, such as SMS text message and email. However, there may be many other methods, including a web page pop-up, store employee verbal communication, a printed notification at Content Provider 109 physical location, and physical delivery of an element to an address, among many others. These methods are not exhaustive and the Notification System 130 in conjunction with Fulfillment System 160 will determine the best available notification method for a given gift.

Upon successful redemption of a gift, with that gift now referred to as Redeemed Gift 154, the system 100 has provided a benefit to the Receiver 106 by solving the optimal time to receive their gift based on criteria that optimizes the time and delivery method for that gift type, Location 148, among other insights and information the Moment Core 101 and its components take into account that have been covered within. The Notification System 130 may help a Receiver 106 by reminding a gift is waiting for them, reducing the burden of recall. Additionally, Notification System 130 may close the Feedback Loop 135 back to the Gifter 104, removing the burden of determining an appropriate response to the Gifter.

One specific method of identification and redemption covered has been the use of credit cards. In this instance, the Insights Engine 140 retains a User 105 credit card information as User Financial Data 144, which may include a User 105 name, all logged to User Profile 141. When the Receiver 106 uses their card during a transaction in which there is a Pending Gift 153, the Insights Engine 140 identifies that Receiver 106 and Fulfillment System 160 can manage the delivery of the gift and notification a number of ways. An example of type of transaction has been referenced, like in Fine Dining. However, this could be any transaction in which a credit card is used. For instance, a gift for "Grocery" would be associated with a purchase made at a supermarket (such as at Kroger or online with FreshDirect.com), or a gift for a baseball cap would be delivered when the Receiver 106 makes a credit card payment at an associated retailer (such as J.Crew or mlb.com) with a recognized payment card logged by User Financial Data 144.

Payment and redemption of the gift may be managed a number of ways. These methods may include blocking the payment of the Receiver 106 at the time of the transaction and instead billing the System directly, or by billing the Gifter 104 directly, all of which may be integrated with Financial Institutions 180 (such as a bank like Bank of America or a payment processor like FirstData). Alternatively, the payment may be made by the Receiver 106 and the Receiver 106 may be credited back the gift amount to a known credit card account (logged by User Financial Data 144) shortly after time of payment or at a later date via a Financial Institution 180.

Payment by a Gifter 104 for use of Moment Network to deliver a gift to a Receiver 106 may occur a number of ways, including flat fee per gift sent, fee equating to a percentage of the value of the gift, subscription fee to access the System, unused amounts of a gift being acquired, among other methods. For instance, payment may be provided by a participating Content Provider 109 engaged with the System (like Coca Cola, or Kroger). A Content Provider 109 may have specific categories that the Gifter 104 is able to select from and receive credits toward a gift, full payment for a gift provided by the Content Provider, or some other promotional means that promotes the Gifter sending a gift through the System.

Insights Engine may track a User 105 and the gifts they send and receive. This information may be incorporated with other available data (such as Facebook and Twitter activity) to generate User Sentiment Score 1412 (as previously mentioned and exemplified in FIG. 10.F), or karma, scoring. For instance, if a given User 105 actively sends one gift a week to another User, their karma score may be higher than one that sends one gift every month. Additionally, if two Users each send one gift a week, but one User is shown to have a higher positive sentiment score through their social media activity, then this User may show a higher karma score by the System.

Additionally, should one User 105 show to have a greater impact as tracked by Insights Engine, their overall User Sentiment Score 1412 may improve. For instance, if one User 105 sends a gift and that single gift is tracked to show that multiple other Users sent a gift in reaction to that User, then that first User may have a higher score logged to their User Profile 141. Scores may be used to provide credits to specific Users, highlight User activity within the System by promoting specific Users and their actions to other Users, among other methods to incentivize Users to engage with Moment Network.

Specific types of communication facilitated by Notification System 130 from one User 105 to another User 105 have been commented previously, like the ability to send a "thank you" as represented in FIG. 8B, screenshot 1022, or screenshots 1021 and 1023 of FIGS. 8A & 8C that represent the system 101 facilitating the sending of a gift. Screenshot 1031 of FIG. 9A comprises notices A, B to the Gifter 104 from the Receiver 106 indicating the gift 154 has been redeemed and includes sentiment from the Receiver 106.

These examples result in Notification System 130 ultimately delivering some form of notification on behalf of one User 105 to another User 105. These communications, as previously noted, may transpire over email, SMS, via a downloaded application to a User 105 PCD running programs 107 & 108 of FIG. 1, among other ways in which one individual is able to communicate with another individual, either established today or yet to be known. One method of communicating information across many platforms today is the use of pictographs, also commonly known as an emoji. Many emoji carry a common meaning (like the common coffee cup image is commonly known to represent a cup of coffee).

The Notification System 130 may use an emoji to convey information from one User 105 to another. More specifically, Notification System 130 may facilitate the use of emoji in communications, an example of which is reflected in FIG. 11A, screenshot 1051. In screenshot 1051, a custom keyboard for selecting a unique emoji for a gift has taken the place of a common keyboard on a User 105 PCD while they are using an email platform (like Google or Yahoo!Mail services). By using this keyboard to send an emoji, this individual may become a Gifter 104 where the person that receives this emoji message then becomes a Receiver 106. The Gift System 150 logs this interaction and a Pending Gift 153 becomes active. This example does not materially differentiate from previously described methods by which the system 100 operates, except that the method by which the information is transferred from Gifter 104 to a Receiver 106 is being highlighted here as that of an emoji, or pictograph image.

FIG. 11B, screenshot 1052, element 'D' reflects an SMS communication in which an ice cream emoji has been entered in a message stream. This is to exemplify how an emoji is commonly understood to be shared today. This use of emoji may be sent through many platforms with an increasing number of platforms supporting image-based communication. What differentiates an emoji in this instance is that an emoji carried by the Moment Gift System 150 may become attached to an actual Pending Gift 153, with all previously mentioned attributes for a Pending Gift 153 holding true.

As an example, carrying the use of the coffee cup emoji forward, selecting this image may enable a Gifter 104 to send a Receiver 106 a cup of coffee. Fulfillment System 160 would operate as previously described by checking available Content Provider(s) 109 and use Notification System 130 as described in detail earlier to notify Receiver 106 of Pending Gift. So, sharing an emoji over a message that Moment Core 101 has access to could result in the gifting from one friend to another.

While some emoji are commonly used across many platforms, like the previously mentioned coffee cup, there also exist many custom emoji images, such as the ice cream cone image represented by FIG. 11A, screenshot 1051, element 'C.' The Gift System 150 may use custom emoji to deliver a specific element from a specific Content Provider 109. For instance, should a Gifter 104 select the custom ice cream emoji, then Receiver 106 may be delivered an ice cream sundae from a specific Content Provider 109, like a ice cream retailer known as of this writing as Cold Stone Creamery. This emoji use could be for a single Cold Stone Creamery store location, all Cold Stone Creamery stores, or even all Content Provider 109, regardless of their product offering.

The process in which a Gifter 104 pays for this emoji transaction also does not materially differ from what has been previously commented within. For instance, the Fulfillment System 160 may charge the Gifter 104 upon the Gift System 150 activating a Pending Gift 153, or may not charge the Gifter 104 until Receiver 106 selects to redeem Pending Gift 153, among other scenarios covered.

Related, the method by which any monetary component is transferred through an emoji transaction is not materially different than what has been previously covered. For instance, the emoji may be attributed a value and assigned a related gift card number with a held value or may itself represent a known value at Content Provider 109 Point of Sale 131, among other previously mentioned scenarios for assigning value to a Pending Gift 153 and charging Gifter 104. Additionally, the emoji image itself may contain a code or pattern by which a value is attributed. This code may be readable at a Content Provider POS.

Receiver 106 may be delivered an electronic notification of the selected emoji, which is reflected in FIG. 11C, screenshot 1053. Here, the emoji, element 'E,' is accompanied by a redeemable gift code, element 'F,' and corresponding redemption number, element 'G,' that could be used by Content Provider 109 to confirm this particular Pending Gift 153 when Receiver 106 presents this information in a store. As previously commented, digital delivery of a Pending Gift 153 is not the only method by which a Receiver 106 may receive a notification by Notification System 130. All information could be sent, for instance, via mail to a physical address, complete with a printed version of the elements commented on screenshot 1053 of FIG. 11C.

Another alternative method for activating a Pending Gift 153 by Gift System 150 may act much like the aforementioned sharing of an emoji. However, instead of sending an emoji image, Gifter 104 may copy a specific address of the system 101 (i.e. —a specific e-mail domain) in a message to their intended Receiver 106 as represented in FIG. 11A, screenshot 1051, element 'B.' In this instance, Gifter 104 has copied a an email address of the gifting system 101 in an email. All remaining Fulfillment System 160 activities that have been described above would then remain in place for the fulfillment of this Pending Gift 153. By including an e-mail address of the system 101 in an e-mail message, Gifter 104 circumvents use of a downloaded application to their PCD.

As previously mentioned and illustrated in FIG. 1, the Moment Core module 101 may also comprise an Admin System 170, which enables the System to manage attributes of all other components of the System (such as Users 105, User Profile 141, Content Providers 109, etc.). The Admin System 170 may manage incentives previously mentioned. These incentives, or Offers 172, could manifest a number of ways to encourage use of Moment Network. For instance, the Admin System may establish a protocol to assign a Gifter 104 a nominal credit (which may be monetary or non-monetary points that may be accrued to establish a monetary credit) to be used toward the purchase of a gift through the System.

The Admin System 170 may receive information via third-party platforms for integrated marketing campaigns. For instance, a marketing program may be run via Facebook or Twitter where Users receive credits within the System for performing some required action (such as "liking" the company Facebook page or sharing a Tweet or post). The Admin System 170 may have an offers component 172 that would log those credits to a user stored the User Profile system 141. Subsequently, the Insight Engine 140 and Gift System 150 would access this information in the User Profile system 141 should a User initiate sending a gift. Additionally, the Admin System 170 may provide Reporting 171, which provides outputs such as User 105 activity within the System.

User 105 activities may be tracked or traced to show the impact Users 105 have on one another. This activity may be mapped by Notification System 130 a number of ways, including the use of mapping tools to show location on a map (such as Google Maps or iOS Maps) where their gifts are being sent and received and surface the connection their gifts may have on other Users, as illustrated in FIGS. 10A-10B screenshots 1041 and 1042.

For instance, one User 105 in Atlanta may send a gift to a User 105 in Chicago and that friend may then send a gift of their own to another User 105 in New York. Illustrated in screenshot 1041 of FIG. 10A, element 'A' illustrates a User, "Damon," started this particular gift giving cycle. Element 'B' indicated that "Damon" is the Gifter 104 and sent to a Receiver 106 named "Christie." Element 'C' then illustrates that "Christie" becomes a Gifter 104 as she sends a gift to a new Receiver 106 named "Daniel." Notification System 130 may then map the connection, showing how the initial gift impacted the larger community and may do so regardless of whether all Users are known to one another, as illustrated with screenschot 1042 of FIG. 10B.

Here, element 'D' of FIG. 10B shows an anchor point, indicating the originating point with a dotted line to element 'E,' indicating a Receiver 106. The dotted line between element 'E' and element 'F' indicates that the Receiver 106 associated with the point on the map as element 'E' became a Gifter 104 to a new Receiver 106 represented by element 'F.' Element 'G' then represents a total summation of the activity first started by our initial Gifter 104 named "Damon" as we see nine gifts sent with a total of 2,345 miles traveled between points on the map. Additional activity and data could be mapped in a similar way, like gifts sent to a particular Content Provider 109 or sent by a particular Gifter 104, among other activates tracked and logged by components of the system 100.

Now, following are a few examples of delivery scenarios to help clarify flows and System functionality. For instances in which the Receiver 106 is asked for input, the system 100 may give the choice of element or element type for redemption to the Receiver 106.

In this case, the Receiver 106 may be presented with a selection powered by Insights Engine 140, Gift System 150 and Fulfillment System 160 (like "dinner", "shopping spree", "Macy's", or "Xbox One") from which they may indicate their gift preference that will in turn be logged by Moment Core 101 to User Profile 141. Additionally, the Fulfillment System 160 may give the Receiver 106 the choice of time for redemption. In this case, the Receiver may be able to decide to have the gift redeemed immediately (at which point the Gift System 150 would reveal the gift and instruction for redemption—covered in more detail below and exemplified in FIG. 5), allow the system 100 to determine the best time (in which case the Insights Engine 140 would prompt the Notification System 160 to inform the Receiver 106 at a later time to redeem—covered in more detail below and exemplified in FIG. 5 block 503), or some specific day and time indicated by the Receiver 106.

Should a specific dollar value be given to Receiver 106 in a Pending Gift 153, as illustrated in FIG. 7D, screenshot 1013 element 'G' and not fully used in the first transaction, that amount selected by the Gifter 104 may carry over and remain on the Reciever's account to spend at a later time, may be carried forward to allow the Receiver 106 to subsequently gift any unused amount to another Receive 106 of their choosing, may be acquired by the system 101, or some other action may take place distributing the unused funds (such as being delivered to a non-profit charity).

For instance, if a Gifter 104 selects "Fine Dining" with an amount selected of "$100" though a Receiver 106 spends only $90 at a "Fine Dining" merchant, a $10 balance will remain. That $10 may be given to the Receiver 106 in the form of a credit (as illustrated in FIG. 8B, screenshot 1021 element 'B') to spend on a future Receiver 106 of their choosing, which would help encourage the process of gift giving.

Alternatively, Fulfillment System 160 may only charge the Gifter 104 the ninety dollars ($90) of the initial one-hundred dollar ($100) purchase price, effectively refunding the difference. Or charge Gifter 104 the $90 purchase price at the time of Redemption by Receiver 106 so no refund would be required.

The Fulfillment System 160 may use a variety of methods to deliver or redeem the selected Pending Gift 153 to the Receiver 106. The Fulfillment System 160 operates by incorporating Insights Engine 140 input, Content Provider 109 information and Gift System 150 information to determine the Pending Gift 153 method of redemption. These may include delivery to the Receiver 106 physical or digital address (such as their home, PO Box, email address, via the System on the User PCD, or SMS), through Geo-Location 134 (using technology such as geo-location, Bluetooth or RFID) possibly in conjunction with Receiver 106 Location 148 at a physical retail store, accessing an eCommerce Platform 132 website (through use of web cookies or User loyalty sign-in), by entering a store (for instance upon identification by a retail employee), at time of checkout with the Point of Sale 131, using User Financial Data 144 to identify the credit card holder, among other methods that are logged as preferred delivery options by Insights Engine 140 for the Receiver 106.

For instance, should the Fulfillment System 160 leverage Geo-Location technology like RFID, the Notification System 130 could log the Receiver 106 Location 148 received and save that via User Profile 141 by Moment Core 101. This Location 148 could indicate that Receiver 106 is in a particular store location (like a J.Crew) and the Notification System 130 could alert that store location of the Receiver 106 and the Pending Gift 153. At which point, the store staff could approach the Receiver 106 and directly notify them of their Pending Gift 153. More references and examples of the Fulfillment System 160 flow follow below and are illustrated predominantly in FIG. 5.

As shown in FIG. 1, the Fulfillment System 160 recognizes general types of gift redemptions, including Physical 161, Digital 162, Intercept 163, and Service 164. The many Physical 161 gift types refer to a redemption in which a Receiver 106 has a tangible gift in hand upon redemption (which may be delivered directly to the Receiver, picked up in store, or some other method to connect the Receiver with the Pending Gift 153). A Digital 162 gift type may include a digital code (like a gift card or promotion code) that the Receiver 106 is able to use to receive a physical good, or may solely exist as a digital gift (like an iTunes music subscription or online game points to Farmville). The Intercept 163 gift type refers to the redemption in which a Receiver 106 payment is superseded by a payment provided through the System, thus "intercepting" the Receiver's intended method of payment. The Receiver is prevented from purchasing a good or service because the System recognizes their purchases matches a gift in waiting and instead charges the Gifter. The actual gift may result in either a Physical 161 or Digital 162 gift type.

For instance, an Intercept 163 gift type may occur when a Receiver 106 goes to pay when in a store. Identification may occur at time of payment by Financial Institution 180 as it registers use of a credit card with recognized User Financial Data 144. Alternatively, the Fulfillment System 160 may interact with other third party applications and Systems (such as OpenTable's reservation platform) in order to identify the Receiver 106. For instance, Receiver 106 may be at a Fine Dining establishment at which point Fulfillment System 160 would determine whether to present the Pending Gift 153 at time of arrival, during the course of the meal, or upon payment.

Regarding Service Provider 164 delivery, if a service is selected by the Gifter 104 (such as home cleaning or a babysitting service), the Fulfillment System 160 may in tandem with Notification System 130 coordinate that service directly with the Receiver 106 to ensure optimal timing, execution and delivery, and to manage a service provider Reservation System 133.

Regarding gift redemption, the Fulfillment System 160, in alignment with the Insights Engine 140, may select a Content Provider 109 to use as the gift provider redeemed by the Receiver 106. In this instance, the Gifter 104 has not selected a specific Content Provider 109 and instead relies on the Fulfillment System 160 to determine the Content Provider best suited for the Receiver 106 as exemplified in FIG. 6 and further explained below.

Referring now to FIG. 12, this figure is an exemplary table 1200 illustrating User Sentiment Scores 1412 referenced in FIG. 1 according to one exemplary embodiment. As described above, information within Insights Engine 140 is used throughout the first machine 104 giving a gift, including notifications to second machines, receivers 106 regarding redemption of gifts, and other touch points in which the system 100 interacts with a user as exemplified in FIGS. 3, 4, and 7-8 and explained above.

The Insights Engine 140 may generate and store its own content, such as through the measurement of sentiment of the Receiver 106 through the collection of data published to Social Media 146 and assign rankings to Receivers 106 based on the content that is published, as exemplified in table 1200, element 'H'—User Sentiment Score. For instance, if one Receiver 106 publishes words such "great", "happy", and "hooray" then they may be assigned a more positive sentiment ranking than a Receiver 106 that uses words like "crummy", "bad", and "sad"—all of which would be saved by the Moment Core module 101 to records stored in the User Profile database 141 by Insights Engine 140 in a table 1200.

Table 1200 of FIG. 12 may exemplify how the Insights Engine 140 may rate a Gifter 104 and/or a Receiver 106 based on activity. Example inputs from channels a Gifter 104/Receiver 106 may interact with are, respectively, Facebook positive reaction (element 'D'), Facebook negative reaction (element 'E'), SMS positive texts (element 'F'), and Moment Network Platform (Moment Core module 101 running on server 99) (element 'G').

A Facebook positive reaction, specifically, may be a summary of a positive interactions from a Gifter 104/Receiver 106 on that platform. These positive attributes may indicate a post to the platform that includes the aforementioned positive content words (like "great" and "happy"), may include another individual "liking" a post, among other actions a Gifter 104/Receiver 106 is able to make on that platform to be deemed as indicating a more positive sentiment. Inversely, a Gifter 104/Receiver 106 may also accumulate Facebook negative reactions, which may be a summation of negative reactions to a post to the platform, negative content being posted (like using words "crummy" and "bad"), among other actions that may be deemed as having a negative sentiment.

Both positive and negative content may originate from other platforms and applications Gifters 104/Receivers 106 provide Moment Core module 101 access to. Content may also originate from a Gifter 104/User 106 interactions with the Moment Network Platform (element 'G') itself, potentially accruing positive sentiment through the number of Pending Gifts 153 sent, among other actions.

Table 1200 demonstrates at least three sample user sentiment scoring examples. machine A (element 'A'), in this case accrued 100 Facebook positive reaction points, 20 Facebook negative reaction points, 50 SMS positive texts points, and 50 Moment Network Platform points. In this situation, machine A has a User Sentiment Score (here reflected as element 'AA') that totals 180. This score is a tally of all positive interaction points, subtracted by any negative interaction points. So, machine A is shown to have 200 positive interaction points, with 20 negative interaction points, resulting in the assigned User Sentiment Score of 180 (element 'AA').

Machine B (element 'B') and Machine C (element 'C') are shown to have User Sentiment Scores, respectively, negative 120 (element 'BB') and positive 60 (element 'CC'). Potentially, the machine with the lowest sentiment score (in this case machine B with a negative 120 score assigned) may receive a notification through the Notification System 130 of a Pending Gift 153 generated by the Gift System 150 with the goal to brighten that day of that machine operator as the Insights Engine 140 may determine an operator of a machine may benefit positively by a random act of kindness. Or, the operator of this machine (also known here as machine B) may be suggested by Insights Engine 140 as a potential Receiver 106 as another Gifter 104 selects who to send a gift to.

Alternatively, machines ranked with higher User Sentiment Scores (in this case machine A and machine C) may receive a notification through the Notification System 130 about their relative higher sentiment scores. These machines may receive a Pending Gift 153 to reinforce their positive sentiment scores, among other actions in which the Insights Engine 140 may engage. Insights Engine 140 may filter Social Media 146 to help determine a reason and timing to prompt that Gifter 104 to send a gift to a Receiver 106.

This information may be paired with information found within Calendars 145 to determine frequency of interaction, important events, among other content saved by Insights Engine 140 to data in the User Profile database 141. Insights Engine 140 may filter this data gathered, among other accessible data (such as News and Pop Culture 1401) and serve recommendations to a Gifter 104 as described above and further exemplified in FIGS. 3, and 7-8. To initiate sending a gift, the system 100 may send a push notification via the Notification System 130 to a potential Gifter 104 to prompt the sending of a gift 153.

Figure 13:
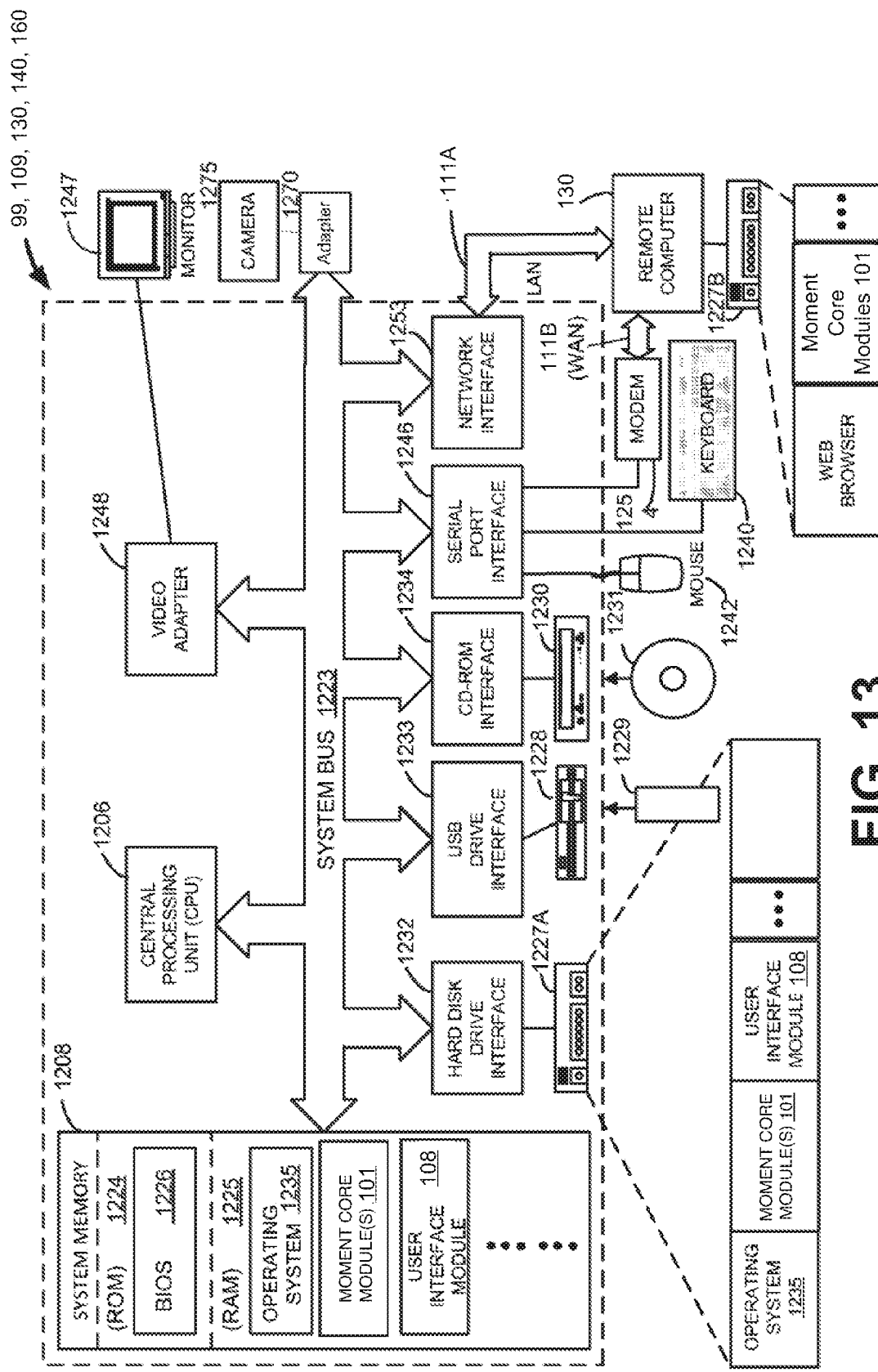
FIG. 13 illustrates an exemplary computers and/or computer architecture according to one exemplary embodiment.

Referring now to FIG. 13, this figure is a functional block diagram of the host computer Server 99 of FIG. 1 that can be used in the system 100 and method for facilitating the transfer of a gift from a first machine to a second machine according to an exemplary embodiment of the invention. The exemplary operating environment for the system 100 of FIG. 1 includes a general-purpose computing device in the form of a conventional computer 99, 109, 130, 140, 160.

Generally, the computer 99 [referred to now as generally 99 but which also covers other servers/computers 109, 130, 140, and 160 of FIG. 1] includes a processing unit 1206, a system memory or storage 1208, and a System bus 1223 that couples various system components including the system memory 1208 to the processing unit 1206.

The system bus 1223 may be any of several types of bus structures including a memory bus or memory controller, a peripheral bus, and a local bus using any of a variety of bus architectures. The System memory includes a read-only memory (ROM) 1224 and a random access memory (RAM) 1225. A basic input/output System (BIOS) 1226, containing the basic routines that help to transfer information between elements within computer 99, such as during start-up, is stored in ROM 1224.

The computer 99 can include a hard disk drive 1227A for reading from and writing to a hard disk, not shown, a universal serial bus (USB) drive 1228 for reading from or writing to a removable USB flash memory unit 1229, and an optical disk drive 1230 for reading from or writing to a removable optical disk 1231 such as a CD-ROM or other optical media. Hard disk drive 1227A, USB drive 1228, and optical disk drive 1230 are connected to System bus 1223 by a hard disk drive interface 1232, a USB drive interface 1233, and an optical disk drive interface 1234, respectively.

Although the exemplary environment described herein employs hard disk 1227A, USB drive 1229, and removable optical disk 1231, it should be appreciated by those skilled in the art that other types of computer readable media which can store data that is accessible by a computer, such as magnetic cassettes, digital video disks (DVDs), Bernoulli cartridges, RAMs, ROMs, and the like, may also be used in the exemplary operating environment without departing from the scope of the invention. Such uses of other forms of computer readable media besides the hardware illustrated will be used in computer networked (i.e. —Internet) connected devices.

The drives and their associated computer readable media illustrated in FIG. 13 provide nonvolatile storage of computer-executable instructions, data structures, program modules, and other data for computer 99. A number of program modules may be stored on hard disk 1227, USB drive 1229, optical disk 1231, ROM 1224, or RAM 1225, including, but not limited to, an operating System 1235 and the Moment Core module(s) 101 and User interface module 108 of FIG. 1.

Program modules include routines, sub-routines, programs, objects, components, data structures, etc., which perform particular tasks or implement particular abstract data types. A User may enter commands and information into computer 99 through input devices, such as a keyboard 1240 and a pointing device 1242.

Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 106 through a serial port interface 1246 that is coupled to the System bus 1223, but may be connected by other interfaces, such as a parallel port, game port, a universal serial bus (USB), Wi-Fi or the like.

The display 1247 may also be connected to System bus 1223 via an interface, such as a video adapter 1248. As noted above, the display 1247 can comprise any type of display devices such as a liquid crystal display (LCD), a plasma display, an organic light-emitting diode (OLED) display, and a cathode ray tube (CRT) display.

A camera 1275 may also be connected to System bus 1223 via an interface, such as an adapter 1270. The camera 1275 can comprise a video camera such as a webcam. The camera 1275 can be a CCD (charge-coupled device) camera or a CMOS (complementary metal-oxide-semiconductor) camera. In addition to the monitor 1247 and camera 1275, the computer 100A may include other peripheral output devices (not shown), such as speakers and printers.

The computer 99 may operate in a networked environment using logical connections to one or more remote computers 130 [or others in FIG. 1 like 109, 140, and 160, just to name an exemplary few]. These remote computers 130 may comprise an Internet browser as illustrated in FIG. 13 that is used to access the Moment Core module(s) 101. In such an exemplary scenario, the computers 99, 130 may comprise one or more server computers coupled together across the computer network 111.

Each remote computer 130 may also be another personal computer, a computer Server, a mobile phone, a router, a network PC, a peer device, tablet (e.g., iPad) or other common network node. While the remote computer 130 typically includes many or all of the elements described above relative to the main computer 199, only a memory storage device 1127B has been illustrated in this FIG. 13 for brevity. The logical connections depicted in FIG. 13 include a local area network (LAN) 111A and a wide area network (WAN) 111B. Such networking environments are commonplace in offices, enterprise-wide computer networks, intranets, and the Internet.

When used in a LAN networking environment, the computer 99 is often connected to the local area network 111A through a network interface or adapter 1253. When used in a WAN networking environment, the computer 99 typically includes a modem 1254 or other means for establishing communications over WAN 111B, such as the Internet. Modem 1254, which may be internal or external, is connected to system bus 1223 via serial port interface 1246. In a networked environment, program modules depicted relative to the main computer 99, or portions thereof, may be stored in the remote memory storage device 1227B of the remote computer 130. It will be appreciated that the network connections shown are exemplary and other means of establishing a communications link between the computers 99 and 130 may be used.

Moreover, one of ordinary skill in the art will appreciate that the present invention may be implemented in other computer System configurations, including hand-held devices, multiprocessor Systems, microprocessor based or programmable consumer electronics, network personal computers, minicomputers, tablets (e.g., iPad) mainframe computers, and the like. The invention may also be practiced in distributed computing environments, where tasks are performed by remote processing devices that are linked through a communications network. In a distributed computing environment, program modules may be located in both local and remote memory storage devices.

Figure 14:
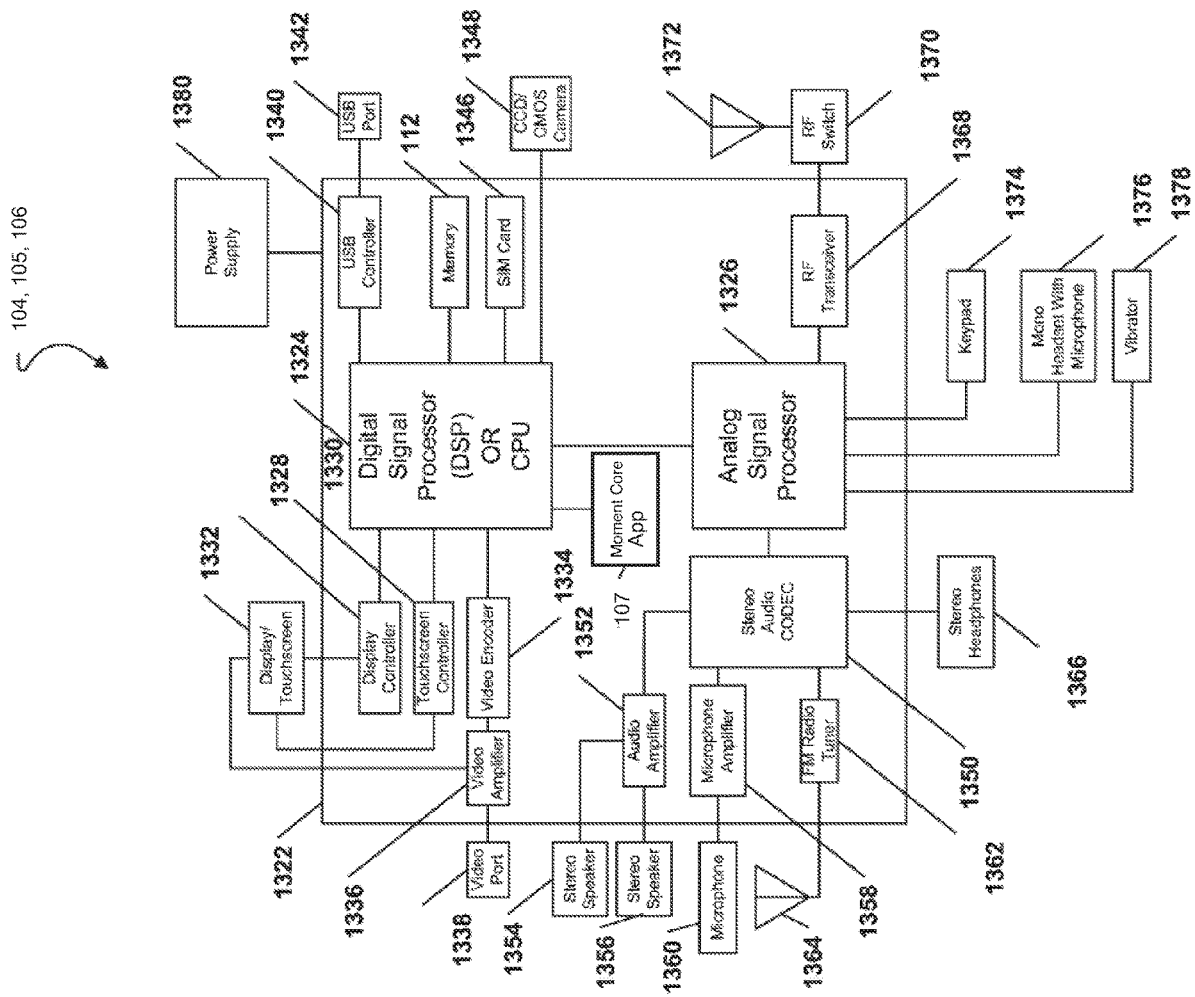
FIG. 14 illustrates an exemplary portable computing device (PCD) according to one exemplary embodiment.

Referring to FIG. 14, this figure is a diagram of an exemplary, non-limiting aspect of a portable computing device (PCD) 104, 105, 106—a machine—comprising a wireless mobile telephone, which corresponds with those presented in the system 100 illustrated in FIG. 1. In this description, the terms "communication device," "wireless device," "wireless telephone," "wireless communication device," and "wireless handset" are used interchangeably. A portable computing device 104, 105, 106 [generally as 104 from this point onward] could be a cellular telephone, a pager, a PDA, a smartphone, a navigation device, or a hand-held computer with a wireless connection or link.

As shown, the mobile telephone 104 includes an on-chip System 1322 that includes a digital signal processor or a central processing unit 1324 and an analog signal processor 1326 that are coupled together. As illustrated in FIG. 14, a display controller 1328 and a touchscreen controller 1330 are coupled to the digital signal processor 1324. A touchscreen display 1332 external to the on-chip System 1322 is coupled to the display controller 1328 and the touchscreen controller 1330.

FIG. 14 further illustrates a video encoder 1334, e.g., a phase-alternating line ("PAL") encoder, a sequential couleur avec memoire ("SECAM") encoder, a national television System(s) committee ("NTSC") encoder or any other video encoder, is coupled to the digital signal processor 1324. Further, a video amplifier 1336 is coupled to the video encoder 1334 and the touchscreen display 1332. A video port 1338 is coupled to the video amplifier 1336. As depicted in FIG. 14, a universal serial bus ("USB") controller 1340 is coupled to the digital signal processor 324. Also, a USB port 1342 is coupled to the USB controller 1340. A memory 112 and a subscriber identity module ("SIM") card 1346 may also be coupled to the digital signal processor 1324.

Further, as shown in FIG. 14, a digital camera 1348 may be coupled to the digital signal processor 1324. In an exemplary aspect, the digital camera 1348 is a charge-coupled device ("CCD") camera or a complementary metal-oxide semiconductor ("CMOS") camera.

As further illustrated in FIG. 14, a stereo audio CODEC 1350 may be coupled to the analog signal processor 1326. Moreover, an audio amplifier 1352 may be coupled to the stereo audio CODEC 1350. In an exemplary aspect, a first stereo speaker 1354 and a second stereo speaker 1356 are coupled to the audio amplifier 1352. FIG. 14 shows that a microphone amplifier 1358 may be also coupled to the stereo audio CODEC 1350. Additionally, a microphone 1360 may be coupled to the microphone amplifier 1358. In a particular aspect, a frequency modulation ("FM") radio tuner 1362 may be coupled to the stereo audio CODEC 1350. Also, an FM antenna 1364 is coupled to the FM radio tuner 1362. Further, stereo headphones 1366 may be coupled to the stereo audio CODEC 1350.

FIG. 14 further illustrates a radio frequency ("RF") transceiver 1368 that may be coupled to the analog signal processor 1326. An RF switch 1370 may be coupled to the RF transceiver 1368 and an RF antenna 1372. The RF transceiver 1368 may communicate with conventional communications networks as well as with global positioning System ("GPS") satellites in order to obtain GPS signals for geographical coordinates.

As shown in FIG. 14, a keypad 1374 may be coupled to the analog signal processor 1326. Also, a mono headset with a microphone 1376 may be coupled to the analog signal processor 1326. Further, a vibrator device 1378 may be coupled to the analog signal processor 1326. FIG. 14 also shows that a power supply 1380 may be coupled to the on-chip System 1322. In a particular aspect, the power supply 1380 is a direct current ("DC") power supply that provides power to the various components of the mobile telephone 104 that require power. Further, in a particular aspect, the power supply is a rechargeable DC battery or a DC power supply that is derived from an alternating current ("AC") to DC transformer that is connected to an AC power source.

FIG. 14 also shows that the mobile telephone 104 may include a moment core application 107 [also shown in FIG. 1]. The moment core application 107 may comprise hardware and/or software. The moment core application 107 may communicate with the moment core module 101 of FIG. 1 running on server 99.

As depicted in FIG. 14, the touchscreen display 1332, the video port 1338, the USB port 1342, the camera 1348, the first stereo speaker 1354, the second stereo speaker 1356, the microphone 1360, the FM antenna 1364, the stereo headphones 1366, the RF switch 1370, the RF antenna 1372, the keypad 1374, the mono headset 1376, the vibrator 1378, and the power supply 1380 are external to the on-chip System 1322.

In a particular aspect, one or more of the method steps described herein (such as illustrated in FIGS. 2-6) may be stored in the memory 112 as computer program instructions, like the Moment Core module(s) 101. These instructions may be executed by the digital signal processor or central processing unit 1324, the analog signal processor 1326, or another processor, to perform the methods described herein. Further, the processors, 1324, 1326, the memory 112, the instructions stored therein, or a combination thereof may serve as a means for performing one or more of the method steps described herein.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or parallel (substantially simultaneously with) other steps without departing from the scope and spirit of the invention. Further, words such and "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification.

Therefore, disclosure of a particular set of program code instructions or detailed hardware devices is not considered necessary for an adequate understanding of how to make and use the invention. The inventive functionality of the claimed computer implemented process is explained in more detail in the above description and in conjunction with the figures that may illustrate various processes flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM, Flash, or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, Server, or other remote source, such as in "cloud" computing, using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk, and blue-ray disc where disks usually reproduce data magnetically, while discs reproduce data optically with lasers. Combinations of the above should also be included within the scope or computer-readable media.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A computer-implemented method for facilitating a sending of a gift from a first machine to a second machine, the computer-implemented method comprising:

a processor of the computer server automatically generating a first list of one or more names of people associated with an appropriate moment for receiving the gift based on a processor review of context information, a processor of the computer server sending the first list and a data entry portion to the first machine, the first machine displaying alphanumeric text describing the context information and the data entry portion, the data entry portion allowing the first machine to provide a name not on the first list to the computer server, the first machine and the second machine comprising hand-held mobile telephones;

a processor of the computer server receiving from the first machine a selection of at least one or more names on the first list who have been identified as associated with a moment for receiving the gift, or the processor of the computer server receiving from the first machine a selection of the name not on the first list from the data entry portion;

a processor of the computer server determining one or more gifts and gift categories for each name that is selected from the first list or the name not on the first list from the data entry portion based on at least one of preference information and the context information stored in a computer database, the computer server storing the one or more gifts and the gift categories in a second list;

a processor of the computer server sending the second list to the first machine, the second list comprises at least one gift and at least one gift category;

a processor of the computer server receiving from the first machine a selection of the gift or a gift category from the second list;

the first machine, after sending the selection of the gift or the gift category to the computer server, displaying two monetary value amount options in a graphical user interface for assigning monetary values for the selected gift or the selected gift category, a first monetary value amount option being positioned above a second monetary value amount option in the graphical user interface, the second monetary value amount option being positioned at a lowest portion of the graphical user interface and comprising an automatic monetary value assignment option;

a processor of the computer server receiving from the first machine a selection from the two monetary value amount options for the selected gift or the selected gift category, the two monetary amount options comprising the first monetary value amount option for receiving an entry of a numerical monetary amount maximum limit from the first machine, and the second monetary value amount option comprising the automatic monetary value assignment option selectable on the first machine with the graphical user interface that allows the processor of the computer server to automatically determine the monetary amount for the selected gift or the selected gift category;

the first machine, after sending the selection from the two monetary value amount options to the computer server, displaying two delivery timing options in a graphical user interface directed to timing of delivery for the selected gift or the selected gift category, a first delivery timing option being positioned above a second delivery timing option in the graphical user interface, the second delivery timing option being positioned at a lowest portion of the graphical user interface and comprising an automatic delivery timing option;

a processor of the computer server receiving from the first machine a selection from the two delivery timing options for the selected gift or the selected gift category, the two delivery timing options comprising the first delivery timing option for immediate delivery and the second delivery timing option comprising the automatic delivery timing option that allows the processor of the computer server to automatically determine timing of delivery for the selected gift or the selected gift category, the processor of the computer server automatically determining the timing of delivery by monitoring activity of the second machine including: global positioning signals identifying a geo-location of the second machine and generated by the second machine, and transactions made with the second machine such that the selected gift or the selected gift category is delivered during a transaction when the second delivery timing option is selected and when determined by the computer server using the automatic delivery timing option; and a processor of the computer server contacting a content provider for arranging delivery of the selected gift to the second machine associated with a name selected from the second list or the name not on the second list from the data entry portion and in accordance with the selected delivery timing option from the first machine.

2. The method of claim 1, wherein the context information identifies the appropriate moment for at least one name for receiving h gift.

3. The method of claim 1, wherein a processor of the computer server sends a message to the second machine that the gift is being sent to the second machine.

4. The method of claim 1, further comprising a processor of the computer server monitoring on-line social media to determine the appropriate moment for sending the gift from the first machine to the second machine.

5. The method of claim 1, further comprising a processor of the computer server creating a user sentiment scoring table for tracking feedback about gifts received at the second machine from the content provider.

6. The method of claim 1, further comprising monitoring with a processor of the computer server financial activity of the second machine and sending a gift message in response to a gift that is associated with the financial activity of the second machine.

7. A system for facilitating a sending of a gift from a first machine to a second machine, the system comprising:

processor means automatically generating a first list of one or more names of people associated with an appropriate moment for receiving a gift based on a processor review of context information;

a processor of the computer server sending the first list and a data entry portion to the first machine, the first machine displaying alphanumeric text describing the context information and the data entry portion, the data entry portion allowing the first machine to provide a name not on a second list to the computer server, the first machine and the second machine comprising handheld mobile telephones;

processor means for receiving from a first machine a selection of the at least one or more names on the first list who have been identified as associated with a moment for receiving the gift, or the processor means for receiving from the first machine the name not on the second list from the data entry portion;

processor means for determining one or more gifts and gift categories for each name that is selected from the first list or the name not on the second list from the data entry portion based on at least one of preference information and the context information stored in a computer database, the computer server storing the one or more gifts and the gift categories in the second list;

processor means for sending the second list to the first machine, the second list comprising at least one gift and at least one gift category;

processor means for receiving from the first machine a selection of h gift or a gift category from the second list;

the first machine, after sending the selection of the gift or h gift category to the computer server, displaying two monetary value amount options in a graphical user interface for assigning monetary values for the selected gift or the selected gift category, a first monetary amount option being positioned above a second monetary value amount option in the graphical user interface, the second monetary value amount option being positioned at a lowest portion of the graphical user interface and comprising an automatic monetary value assignment option;

processor means for receiving from the first machine a selection from the two monetary value amount options for the selected gift or the selected gift category, the two monetary value amount options the first monetary value amount option for receiving an entry of a numerical monetary amount maximum limit from the first machine, and the second monetary value amount option comprising the automatic monetary value assignment option selectable on the first machine with the graphical user interface that allows the processor of the computer server to automatically determine the monetary amount for the selected gift or the selected gift category;

the first machine, after sending the selection from the two monetary value amount options to the computer server, displaying two delivery timing options in a graphical user interface directed to timing of delivery for the selected gift or the selected gift category, a first delivery timing option being positioned above a second delivery timing option in the graphical user interface, the second delivery timing option being positioned at a lowest portion of the graphical user interface and comprising an automatic delivery timing option;

processor means for receiving from the first machine a selection from the two delivery timing options for the selected gift or the selected gift category, the two delivery timing options comprising the first delivery timing option for immediate delivery and the second delivery timing option comprising the automatic delivery timing option that allows the processor of the computer server to automatically determine timing of delivery for the selected gift or the selected gift category, the processor of the computer server automatically determining the timing of delivery by monitoring activity of the second machine including: global positioning signals identifying a geo-location of the second machine and generated by the second machine, and transactions made with the second machine such that the selected gift or the selected gift category is delivered during a transaction made with the second machine when the second delivery timing option is selected and when determined by the computer server using the automatic delivery timing option; and processor means for contacting a content provider for arranging delivery of the selected gift to the second machine associated with a name selected from the second list or the name not on the second list from the data entry portion and in accordance with the selected delivery timing option from the first machine.

8. The system of claim 7, wherein each of the one or more names being associated with the second machine.

9. The system of claim 7, wherein the context information identifies the appropriate moment for at least one name for receiving the gift.

10. The system of claim 7, further comprising processor means for sending a message to the second machine that the gift is being sent to the second machine.

11. The system of claim 7, further comprising processing means for monitoring on-line social media to determine the appropriate moment for sending the gift from the first machine to the second machine.

12. The system of claim 7, further comprising processing means for creating a user sentiment scoring table for tracking feedback about gifts received at the second machine from the content provider.

13. The system of claim 7, further comprising processing means for monitoring financial activity of the second machine and sending a gift message in response to the gift that is associated with the financial activity of the second machine.

* * * * *